US011585898B2

(12) United States Patent
Saito

(10) Patent No.: US 11,585,898 B2
(45) Date of Patent: Feb. 21, 2023

(54) SIGNAL PROCESSING DEVICE, SIGNAL PROCESSING METHOD, AND PROGRAM

(71) Applicant: Sony Corporation, Tokyo (JP)

(72) Inventor: Mamoru Saito, Tokyo (JP)

(73) Assignee: Sony Group Corporation, Tokyo (JP)

( * ) Notice: Subject to any disclaimer, the term of this patent is extended or adjusted under 35 U.S.C. 154(b) by 843 days.

(21) Appl. No.: 16/474,367

(22) PCT Filed: Dec. 28, 2017

(86) PCT No.: PCT/JP2017/047287
§ 371 (c)(1),
(2) Date: Jun. 27, 2019

(87) PCT Pub. No.: WO2018/131514
PCT Pub. Date: Jul. 19, 2018

(65) Prior Publication Data
US 2019/0339366 A1 Nov. 7, 2019

(30) Foreign Application Priority Data
Jan. 13, 2017 (JP) .............................. JP2017-003916

(51) Int. Cl.
*G01S 7/48* (2006.01)
*H04N 5/369* (2011.01)
(Continued)

(52) U.S. Cl.
CPC .......... *G01S 7/4808* (2013.01); *G01S 7/4863* (2013.01); *G01S 7/4865* (2013.01); *G01S 17/10* (2013.01);
(Continued)

(58) Field of Classification Search
CPC .... G01S 7/4808; G01S 7/4863; G01S 7/4865; G01S 7/4868; G01S 17/10; G01S 17/89; H04N 5/3745; H04N 5/36965
See application file for complete search history.

(56) References Cited

U.S. PATENT DOCUMENTS

2016/0097844 A1 4/2016 Takano
2017/0315238 A1* 11/2017 Nagai ..................... G01S 17/08
2019/0391266 A1* 12/2019 Mori ..................... G01S 7/4915

FOREIGN PATENT DOCUMENTS

EP        3104191 A1    12/2016
JP    2004-294420 A    10/2004
(Continued)

OTHER PUBLICATIONS

Extended European Search Report dated Nov. 26, 2019 for corresponding European Application No. 17892009.6.

*Primary Examiner* — Kevin K Pyo
(74) *Attorney, Agent, or Firm* — Michael Best & Friedrich LLP

(57) ABSTRACT

The present disclosure relates to a signal processing device that enables detection of the distance between an imaging device and a subject using an imaging device with high versatility, a signal processing method, and a program. A determination part classifies pixels to a plurality of pixel groups, and determines a pair of a first pixel group and a second pixel group using for detection of distance between the imaging device and the subject from a plurality of pixel groups on the basis of a charge accumulation period for each pixel group of the imaging device in which charge accumulation period is controlled, and a light projection period of pulse light projected toward the subject of the imaging device, for each pixel group. The present disclosure can be applied to, for example, a distance detection device or the like.

18 Claims, 30 Drawing Sheets

(51) Int. Cl.
*G01S 7/4863* (2020.01)
*G01S 17/89* (2020.01)
*G01S 17/10* (2020.01)
*G01S 7/4865* (2020.01)
*H04N 5/3745* (2011.01)

(52) U.S. Cl.
CPC ......... *G01S 17/89* (2013.01); *H04N 5/36965* (2018.08); *H04N 5/3745* (2013.01)

(56) References Cited

FOREIGN PATENT DOCUMENTS

| | | |
|---|---|---|
| JP | 2010-213231 A | 9/2010 |
| JP | 2014208018 A | 11/2014 |
| JP | 2016090435 A | 5/2016 |
| WO | 2008/152647 A2 | 12/2008 |
| WO | WO-2014208018 A1 | 12/2014 |
| WO | WO-2015118884 A1 | 8/2015 |
| WO | WO-2018101187 A1 | 6/2018 |

\* cited by examiner

SIGNAL PROCESSING DEVICE, SIGNAL PROCESSING METHOD, AND PROGRAM

TECHNICAL FIELD

The present disclosure relates to a signal processing device, a signal processing method, and a program, and in particular, a signal processing device that is capable of detecting the distance between an imaging device and a subject using an imaging device with high versatility, a signal processing method, and a program.

BACKGROUND ART

The time of flight (ToF) method is a method of detecting the distance between an imaging device and a target object by taking a target object as a subject, projecting pulse light toward the subject, and measuring time until reflected light from the subject is received by the imaging device.

As a technology for realizing the ToF method, there is a technology using a complementary metal-oxide semiconductor (CMOS) imaging device having a charge distribution type pixel structure (see, for example, Patent Document 1). With this technology, the distance between the subject and the imaging device can be detected, for example, by distributing and holding accumulated charges of a leading part and accumulated charges of a trailing part by the reflected light from the subject with respect to the projected pulse light, for each pixel, and obtaining the ratio of the amounts of accumulated charges of both.

However, in a CMOS imaging device having a charge distribution type pixel structure, at least two memories per pixel are required to hold the distributed accumulated charges.

Therefore, a technology using an imaging device having two pixel groups having different charge accumulation periods has been devised (see, for example, Patent Document 2). In this technology, the distance between the subject and the imaging device in each pixel can be detected with one memory per pixel by synchronizing start time or end time of the pulse light projection period with start time or end time of the charge accumulation period of each pixel group.

CITATION LIST

Patent Document

Patent Document 1: Japanese Patent Application Laid-Open No. 2004-294420
Patent Document 2: Japanese Patent Application Laid-Open No. 2010-213231

SUMMARY OF THE INVENTION

Problems to be Solved by the Invention

However, in the technology disclosed in Patent Document 2, it is necessary to control the start time and the end time of the charge accumulation period of the imaging device for each pixel group on the basis of the start time and the end time of the pulse light projection period. Accordingly, it is desirable to detect the distance between the imaging device and the subject using an imaging device with high versatility that cannot perform such control.

The present disclosure has been made in view of such a situation, and enables detection of the distance between an imaging device and a subject using an imaging device with high versatility.

Solutions to Problems

A signal processing device of a first aspect of the present disclosure is a signal processing device including a determination part that determines a pair of pixel groups used for detection of the distance between an imaging device and a subject on the basis of a charge accumulation period for each pixel group of the imaging device of which the charge accumulation period is controlled for each pixel group, and a light projection period of pulse light to be projected.

A signal processing method and a program of the first aspect of the present disclosure correspond to the signal processing device of the first aspect of the present disclosure.

In the first aspect of the present disclosure, a pair of pixel groups used for detection of the distance between an imaging device and a subject is determined on the basis of a charge accumulation period for each pixel group of the imaging device of which the charge accumulation period is controlled for each pixel group, and a light projection period of pulse light to be projected.

A signal processing device of a second aspect of the present disclosure is a signal processing device including a distance possibility judgement part that judges whether operation of distance from an imaging device to a subject is possible on the basis of a first charge accumulation period for a first pixel group of the imaging device, a second charge accumulation period for a second pixel group of the imaging device, and a projection period of pulse light to be projected toward the subject of the imaging device.

In the second aspect of the present disclosure, whether operation of distance from an imaging device to a subject is possible is judged on the basis of a first charge accumulation period for a first pixel group of the imaging device, a second charge accumulation period for a second pixel group of the imaging device, and a projection period of pulse light to be projected toward the subject of the imaging device.

Note that the signal processing device of the second aspect of the present disclosure can be realized by causing a computer to execute a program.

Furthermore, a program to be executed by a computer to realize the signal processing devices of the first and the second aspect of the present disclosure can be provided by being transmitted via a transmission medium or recorded on a recording medium.

Effects of the Invention

According to the first and second aspects of the present disclosure, the distance between the imaging device and the subject can be detected using an imaging device with high versatility.

Note that the effects described herein are not necessarily limited, and any of the effects described in the present disclosure may be applied.

MODE FOR CARRYING OUT THE INVENTION

Hereinafter, modes (hereinafter, referred to as embodiments) for implementing the present disclosure will be described. Note that the description will be given in the following order.

Figure 29:
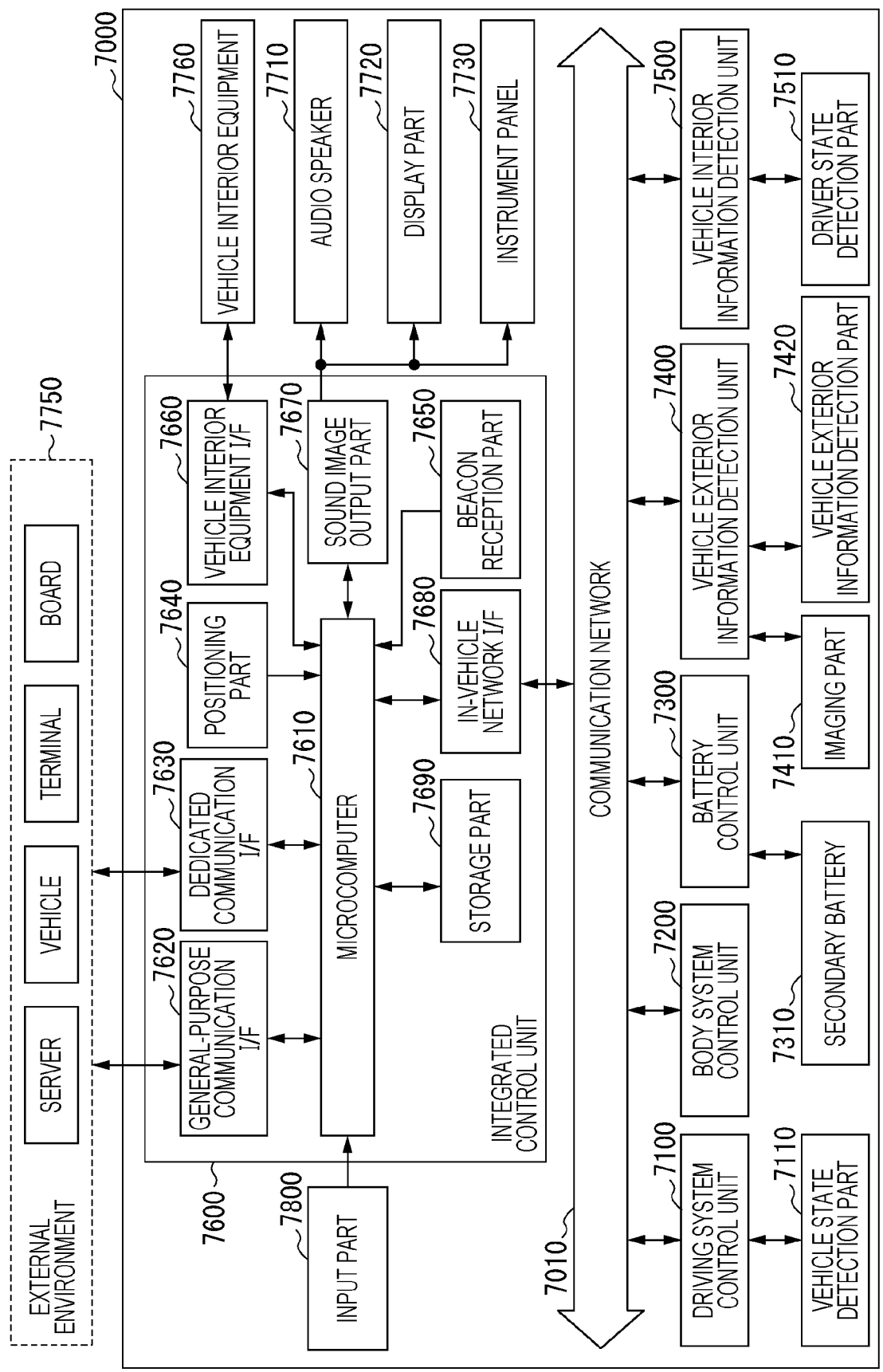
FIG. 29 is a block diagram showing a schematic configuration example of a vehicle control system.
Figure 30:
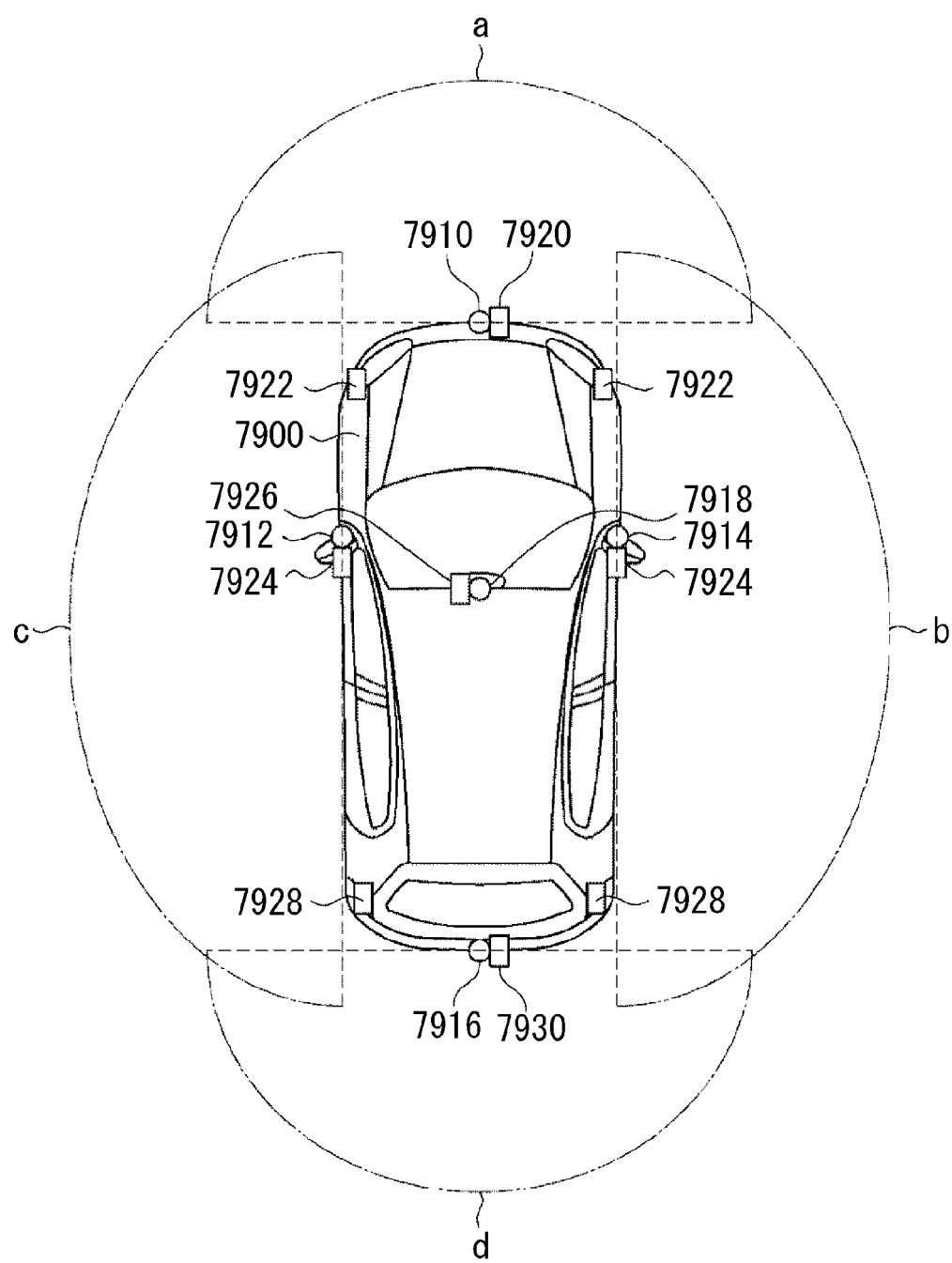
FIG. 30 is an explanatory diagram showing an example of installation positions of a vehicle exterior information detection part and an imaging part.

1. First Embodiment: Distance Detection Device (FIGS. 1 to 20)
2. Second Embodiment: Distance Detection Device (FIG. 21)
3. Third Embodiment: Distance Detection Device (FIG. 22)
4. Fourth Embodiment: Distance Detection Device (FIG. 23)
5. Fifth Embodiment: Distance Detection Device (FIG. 24)
6. Sixth Embodiment: Distance Detection Device (FIGS. 25 to 27)
7. Seventh Embodiment: Computer (FIG. 28)
8. Application Example (FIGS. 29 and 30)

First Embodiment (Configuration Example of First Embodiment of Signal Processing Device)

Figure 1:
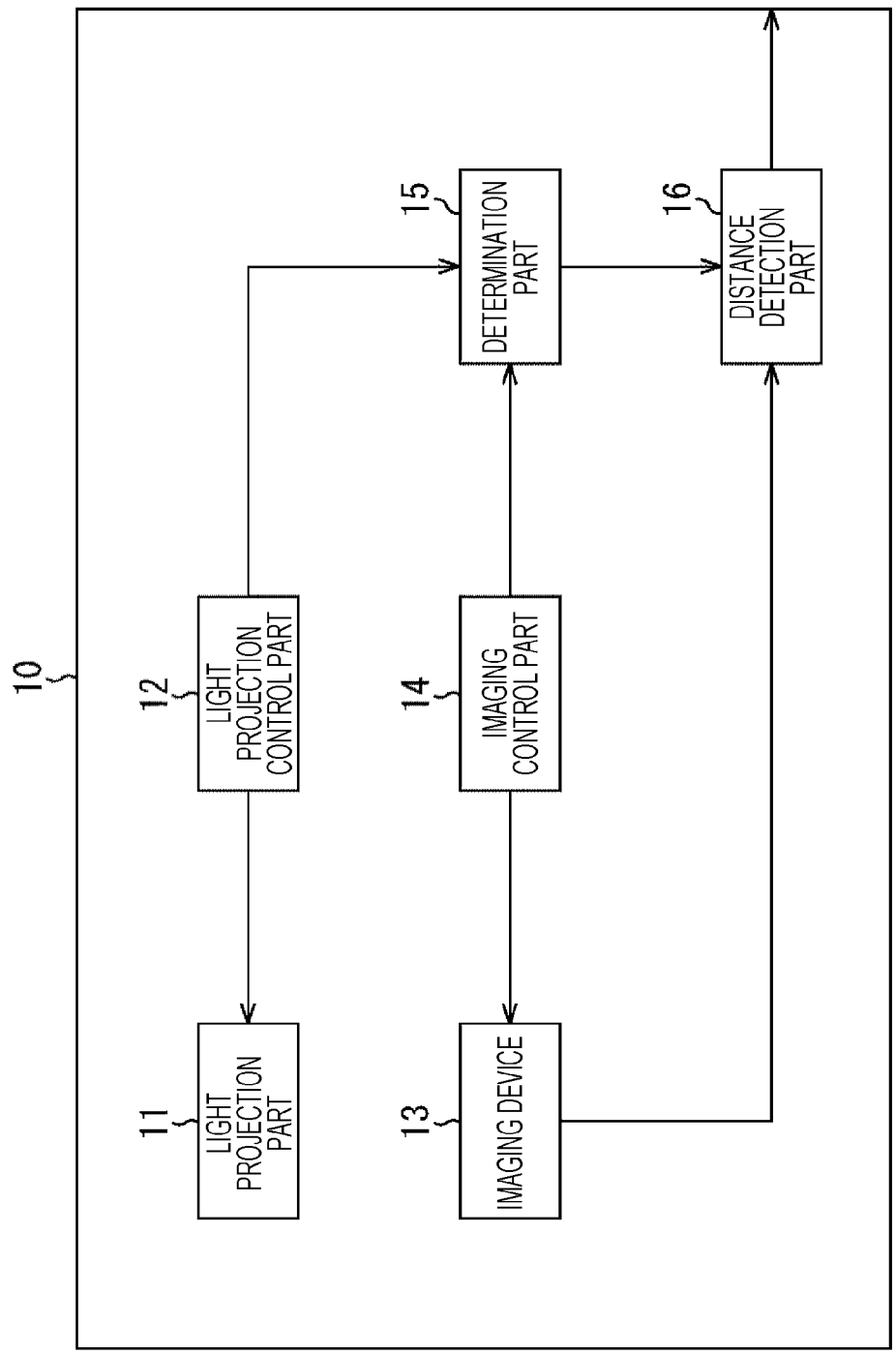
FIG. 1 is a block diagram showing a configuration example of a first embodiment of a distance detection device as a signal processing device to which the present disclosure is applied.

FIG. 1 is a block diagram showing a configuration example of a first embodiment of a distance detection device as a signal processing device to which the present disclosure is applied.

A distance detection device 10 in FIG. 1 includes a light projection part 11, a light projection control part 12, an imaging device 13, an imaging control part 14, a determination part 15, and a distance detection part 16. The distance detection device 10 detects the distance between the imaging device 13 and a target object using the ToF method by taking the target object as a subject.

The light projection part 11 is, for example, a strobe device including a visible light light emitting diode (LED) or the like. The light projection part 11 starts to project pulse light toward the target object which is the subject of the imaging device 13 in response to a light projection start signal supplied from the light projection control part 12, and ends the light projection in response to a light projection end signal.

The light projection control part 12 determines light projection start time, light projection time, and a light projection cycle of the first pulse light. The light projection control part 12 determines the light projection period of each pulse light on the basis of the light projection start time, the light projection time, and the light projection cycle of the first pulse light. The light projection control part 12 has a timing generator (timing generation circuit). The timing generator of the light projection control part 12 generates a light projection start signal that is a timing signal instructing start of light projection of pulse light, and a light projection end signal that is a timing signal giving an instruction on end of light projection for each pulse light on the basis of the determined light projection period of each pulse light. The light projection control part 12 supplies the light projection start signal and the light projection end signal to the light projection part 11 to cause the light projection part 11 to project pulse light during the light projection period. Furthermore, the light projection control part 12 supplies the light projection period to the determination part 15.

The imaging device 13 has pixels in a matrix form. The imaging device 13 classifies pixels in a matrix form into a plurality of pixel groups for each block including one or more pixels. For example, the imaging device 13 classifies pixels in a matrix form into different pixel groups for each row. The imaging device 13 starts the charge accumulation in each pixel according to the charge accumulation start signal supplied from the imaging control part 14, and ends the charge accumulation in each pixel according to the charge accumulation end signal, for each pixel group. The imaging device 13 supplies an electric signal of the charge accumulated in each pixel to the distance detection part 16 as a pixel signal.

Figure 2:
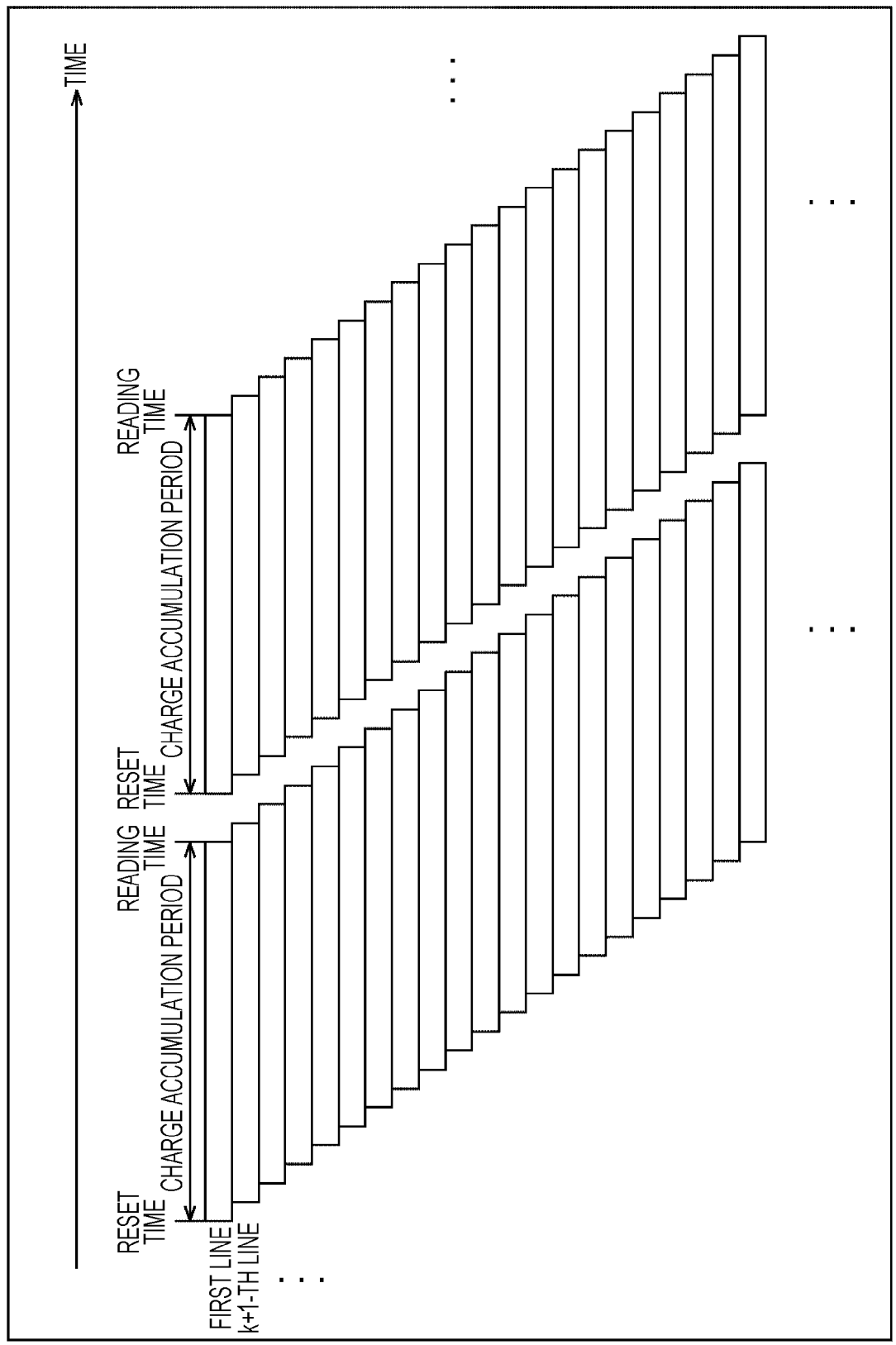
FIG. 2 is a diagram for explaining a rolling shutter function.

Note that, as the imaging device 13, for example, a general CMOS imaging device with high versatility can be used. In other words, a general CMOS imaging device has a rolling shutter function. In the rolling shutter function, as shown in FIG. 2, the charge reading is controlled such that the charge accumulation period from the charge reset time to the charge reading time is shifted for each predetermined period for each k rows (k is an integer of 1 or more). Accordingly, such a CMOS imaging device can be employed as the imaging device 13 that classifies pixels in a matrix form to different pixel groups for each row.

The imaging control part 14 determines the charge accumulation period for each pixel group. The imaging control part 14 has a timing generator (timing generation circuit). The timing generator of the imaging control part 14 generates a charge accumulation start signal that is a timing signal giving an instruction on start of charge accumulation, and a charge accumulation end signal that is a timing signal giving an instruction on end of accumulation, for each pixel group, on the basis of the determined charge accumulation period of each pixel group. The imaging control part 14 supplies the generated charge accumulation start signal and charge accumulation end signal to the imaging device 13 for each pixel group, to control the imaging device 13 such that the pixel classified to the pixel group accumulates the charge during the charge accumulation period. Furthermore, the imaging control part 14 supplies the charge accumulation period of each pixel group to the determination part 15.

The determination part 15 determines a pair of a first pixel group and a second pixel group used for detection of the distance between the imaging device 13 and the subject (target object) by the ToF method, from a plurality of pixel groups, on the basis of the light projection period and the charge accumulation period of each pixel group for each pulse light. The determination part 15 associates the light projection period of each pulse light with the pair information indicating the charge accumulation period of the first pixel group and the second pixel group corresponding to the pulse light, and supplies the result to the distance detection part 16. Note that the determination part 15 may associate the light projection period of each pulse light with the pair information corresponding to the pulse light, and temporarily hold the result.

The distance detection part 16 selects pixel signals of the pixels classified to the first pixel group and the second pixel group corresponding to the pulse light from the pixel signal of each pixel supplied from the imaging device 13 on the basis of the pair information supplied from the determination part 15, for each pulse light. The distance detection part 16 detects the distance between the imaging device 13 and the subject (target object) in the pixel of the first pixel group by the ToF method on the basis of the selected pixel signal and the light projection period, for each pulse light.

Note that the distance detection part 16 may apply predetermined signal processing with respect to the selected pixel signal, and generate a pixel signal suitable for distance detection by the ToF method to detect the distance between the imaging device 13 and the subject on the basis of the pixel signal.

For example, in a case where red, green, and blue color filters arranged in a predetermined array are mounted on the pixels in a matrix form of the imaging device 13, a red pixel (R pixel), a green pixel (G pixel), and a blue pixel (B pixel) have different spectral transmission characteristics depending on the wavelength of light included in the pulse light. Accordingly, even in a case where reflected light of pulse light from the same subject is received, differences occur in pixel signals among the R pixel, the G pixel, and the B pixel. Therefore, in this case, the distance detection part 16 applies signal processing on the selected pixel signal to fill the difference of the spectral transmission characteristics of the R pixel, the G pixel, and the B pixel. Note that the distance detection part 16 may not apply signal processing on the R pixel, the G pixel, and the B pixel, and use only the pixel signal of any one of the R pixel, the G pixel, and the B pixel for distance detection.

Furthermore, in a case where the light amount of the pulse light is small, the signal amount of the pixel signal corresponding to the reflected light is small, and is easily influenced by the noise component. Accordingly, in this case, for example, the distance detection part 16 applies signal processing on the selected pixel signal to reduce noise while amplifying the signal amount of the pixel signal.

Moreover, in a case where the charge accumulation period of each pixel of the first pixel group and the second pixel group is significantly longer than the light projection period, the ratio of the signal amount due to external light other than pulse light with respect to the signal amount due to the reflected light of the pulse light among the signal amount of the pixel signal of each pixel is large in some cases. Accordingly, in this case, for example, the distance detection part 16 applies signal processing on the selected pixel signal to subtract the signal amount of the pixel signal when the pulse light is not projected, to remove the signal amount due to the external light from the signal amount of the selected pixel signal.

As described above, the distance detection part 16 can generate a pixel signal suitable for distance detection by the ToF method, and detect the distance between the imaging device 13 and the subject on the basis of the pixel signal to improve the detection accuracy of the distance. The distance detection part 16 outputs the detected distance.

Note that a color filter may or may not be mounted on each pixel of the imaging device 13. In a case where a color filter is not mounted on each pixel of the imaging device 13, the distance detection part 16 can detect the distance between the imaging device 13 and the subject with high accuracy without applying signal processing on the pixel signal to fill the difference in the spectral transmission characteristics of the R pixel, the G pixel, and the B pixel.

Furthermore, the light projection part 11 may be infrared light LED. In this case, the imaging device 13 is an imaging device having a pixel capable of receiving infrared light. Note that, in this case, the imaging device 13 may include a pixel capable of receiving infrared light of an imaging device (not shown) including both a pixel capable of receiving infrared light and a pixel capable of receiving visible light. In other words, the imaging device not shown may have a pixel capable of receiving infrared light for distance detection and a pixel capable of receiving visible light for photographing, and the imaging device 13 may include only the pixel for distance detection. In this case, photographing and distance detection can be performed simultaneously.

Moreover, the imaging device 13 may include a pixel for distance detection of an imaging device (not shown) including both a pixel for photographing that performs charge accumulation for charge accumulation time suitable for photographing, and a pixel for distance detection that performs charge accumulation for charge accumulation time suitable for the ToF. In this case, photographing and distance detection can be performed simultaneously. Furthermore, the pulse light of visible light projected from the light projection part 11 can also be used as a video light at the time of photographing.

Furthermore, the imaging device 13 may be a pixel for distance detection of an imaging device (not shown) having a pixel for photographing, a pixel for distance detection, and a pixel for phase difference detection that is disposed discretely and detects a phase difference using different pupil regions of a photographing lens. In this case, photographing, distance detection by the ToF method, and distance detection by the phase difference detection method can be performed simultaneously. As a result, for example, in a dark place where the accuracy of distance detection in the phase difference detection method is lowered, the distance detection result by the ToF method can be adopted, and in the bright place, the distance detection result by the phase difference detection method can be adopted. Furthermore, since the pulse light is projected by the light projection part 11, the accuracy of the distance detection result by the phase difference detection method in the dark place is improved.

(Explanation of Distance Detection Processing)

Figure 3:
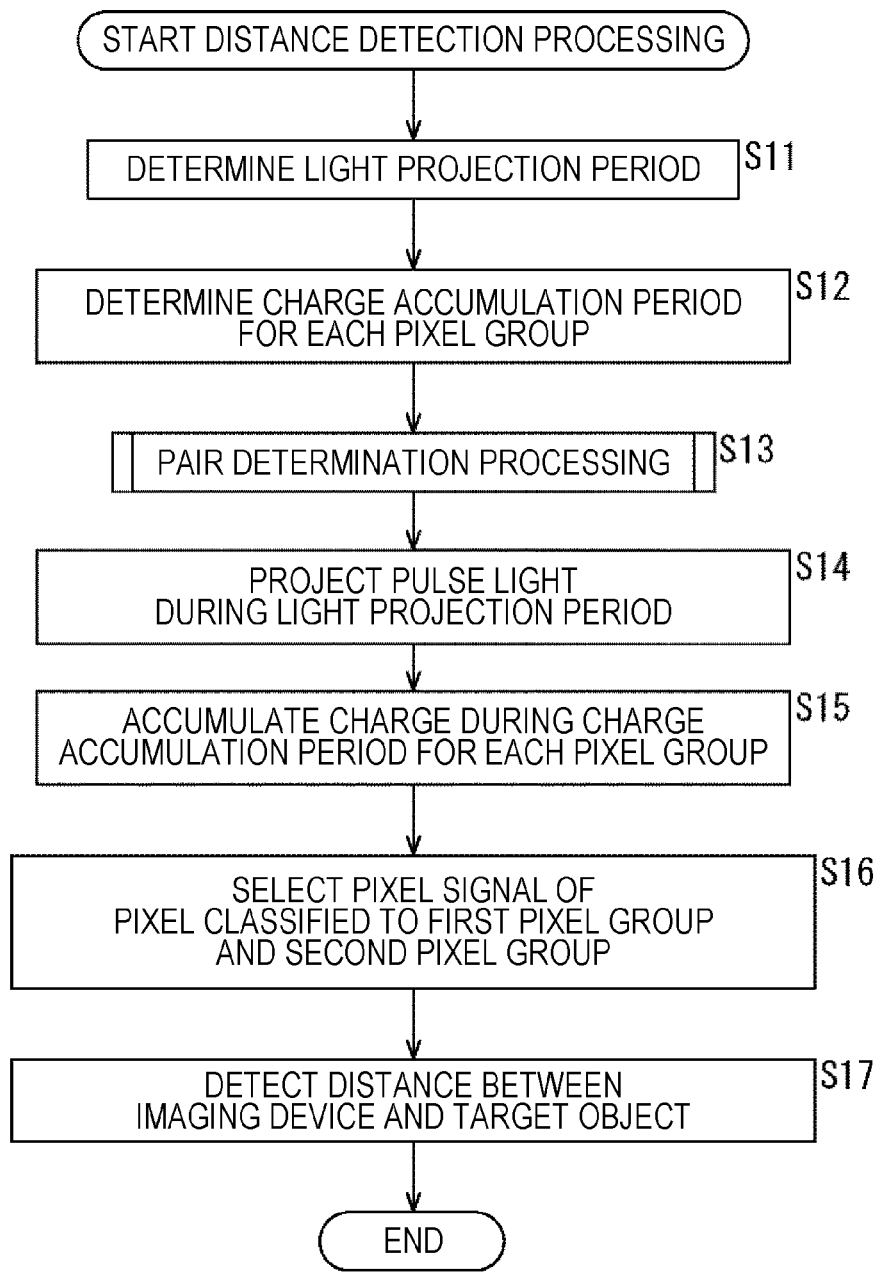
FIG. 3 is a flowchart explaining distance detection processing.

FIG. 3 is a flowchart explaining distance detection processing of the distance detection device 10 of FIG. 1. This distance detection processing is performed, for example, for each pulse light group that is one or more pieces of pulse light projected within a predetermined unit time.

In step S11 of FIG. 3, the light projection control part 12 determines light projection start time, light projection time, and a light projection cycle of the first pulse light, and determines the light projection period of each pulse light of the pulse light group of the processing target on the basis of the light projection start time, the light projection time, and the light projection cycle. Then, the timing generator of the light projection control part 12 generates the light projection start signal and the light projection end signal for each pulse light on the basis of the determined projection period of each pulse light, and supplies the light projection start signal and the light projection end signal to the light projection part 11. Furthermore, the light projection control part 12 supplies the light projection period of each pulse light to the determination part 15.

In step S12, the imaging control part 14 determines a charge accumulation period for each pixel group. The timing generator of the imaging control part 14 generates a charge accumulation start signal and a charge accumulation end signal for each pixel group on the basis of the determined charge accumulation period of each pixel group, and supplies the charge accumulation start signal and the charge accumulation end signal to the imaging device 13. Furthermore, the imaging control part 14 supplies the charge accumulation period of each pixel group to the determination part 15.

In step S13, the determination part 15 performs pair determination processing of determining the pair of the first pixel group and the second pixel group from a plurality of pixel groups on the basis of the light projection period and the charge accumulation period of each pixel group for each pulse light. The details of the pair determination processing will be described with reference to FIG. 4, FIG. 7, FIG. 10, FIG. 13, FIG. 16, FIG. 19, or FIG. 20 as described later.

In step S14, the light projection part 11 projects pulse light toward the subject during the light projection period on the basis of the light projection start signal and the light projection end signal supplied from the light projection control part 12.

In step S15, the imaging device 13 accumulates charges in each pixel during the charge accumulation period on the basis of the charge accumulation start signal and the charge accumulation end signal supplied from the imaging control part 14 for each pixel group. The imaging device 13 supplies an electric signal of the charge accumulated in each pixel to the distance detection part 16 as a pixel signal.

In step S16, the distance detection part 16 selects pixel signals of the pixels classified to the first pixel group and the second pixel group corresponding to the pulse light from the pixel signal of each pixel supplied from the imaging device 13 on the basis of the pair information supplied from the determination part 15, for each pulse light.

In step S17, the distance detection part 16 detects the distance between the imaging device 13 and the subject (target object) in the pixel of the first pixel group by the ToF method on the basis of the selected pixel signal and the light projection period, for each pulse light. The distance detection part 16 outputs the distance and ends the processing.

(Explanation of First Example of Pair Determination Processing)

Note that, hereinafter, time T1 is the start time of the charge accumulation period of each pixel group as a candidate for the first pixel group supplied from the imaging control part 14, and time T2 is the start time of the projection period of the processing target pulse light of the pair determination processing supplied from the light projection control part 12. Time T3 is the start time of the light reception period of the reflected light of the processing target pulse light from the subject by the imaging device 13, and time T4 is the start time of the charge accumulation period of each pixel group as a candidate for the second pixel group supplied from the imaging control part 14. Time T5 is the end time of the light projection period of the processing target pulse light supplied from the light projection control part 12, and time T6 is the end time of the light reception period of the processing target pulse light. Time T7 is the end time of the charge accumulation period of a candidate for the first pixel group supplied from the imaging control part 14, and time T8 is the end time of the charge accumulation period of a candidate for the second pixel group supplied from the imaging control part 14. Time T9 is the start time of the light projection period of the pulse light next to the processing target pulse light supplied from the light projection control part 12.

In other words, the light projection part 11 projects the processing target pulse light during the light projection period from the time T2 to the time T5, in other words, from time T2 to the light projection time (T5−T2). Note that the interval of the light projection start time of the pulse light is (T9−T2). Furthermore, the imaging device 13 receives the reflected light from the subject of the processing target pulse light during the light reception period from the time T3 to the time T6. Each pixel of the pixel group as a candidate for the first pixel group of the imaging device 13 accumulates the charge corresponding to the amount of the reflected light received during the charge accumulation period from the time T1 to the time T7. Furthermore, each pixel of the pixel group as a candidate for the second pixel group of the imaging device 13 accumulates the charge corresponding to the amount of the reflected light received during the charge accumulation period from the time T4 to the time T8.

In the following, the time T1 is referred to as charge accumulation start time T1, the time T2 is referred to as light projection start time T2, the time T3 is referred to as light reception start time T3, the time T4 is referred to as charge accumulation start time T4, the time T5 is referred to as light projection end time T5, the time T6 is referred to as light reception end time T6, the time T7 is referred to as charge accumulation end time T7, the time T8 is referred to as charge accumulation end time T8, and the time T9 is referred to as light projection start time T9.

Figure 4:
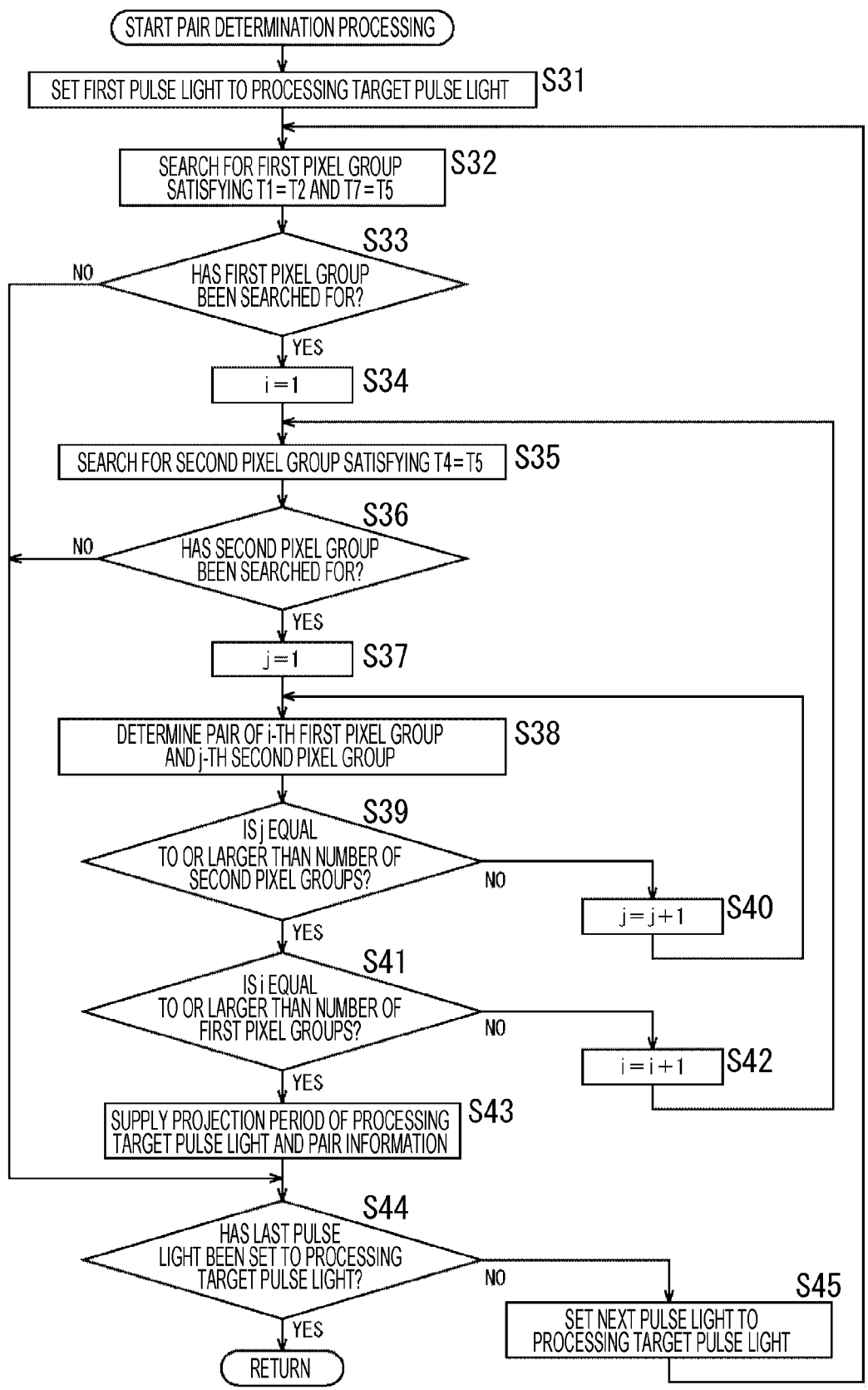
FIG. 4 is a flowchart explaining a first example of pair determination processing.

FIG. 4 is a flowchart explaining a first example of pair determination processing in step S13 of FIG. 3.

In step S31 of FIG. 4, the determination part 15 sets the first pulse light of the processing target pulse light group to the processing target pulse light.

In step S32, the determination part 15 searches for the first pixel group in which the charge accumulation start time T1 is the same as the light projection start time T2 and the charge accumulation end time T7 is the same as the light projection end time T5.

In step S33, the determination part 15 decides whether the first pixel group has been found as a result of the processing of step S32. In a case where it is decided in step S33 that the first pixel group has been found, the determination part 15 determines the found first pixel group, that is, a pixel group in which the charge accumulation period is the same as the projection period of the processing target pulse light as the first pixel group.

In step S34, the determination part 15 sets the count value i to 1.

In step S35, the determination part 15 searches for the second pixel group in which the charge accumulation start time T4 supplied from the imaging control part 14 is the same as the light projection end time T5 supplied from the light projection control part 12.

In step S36, the determination part 15 decides whether the second pixel group has been found as a result of the processing of step S35. In a case where it is decided in step S36 that the second pixel group has been found, the determination part 15 determines the found second pixel group as the second pixel group, and the process proceeds to step S37.

In step S37, the determination part 15 sets the count value j to 1.

In step S38, the determination part 15 determines a pair of the i-th first pixel group among the one or more first pixel groups found in step S32, and the j-th second pixel group among the one or more second pixel groups found in step S36 as a pair of the first pixel group and the second pixel group used for detection of the distance between the imaging device 13 and the target object.

In step S39, the determination part 15 decides whether the count value j is equal to or larger than the number of second pixel groups found in step S35. In a case where it is decided in step S39 that the count value j is not equal to or larger than the number of second pixel groups found in step S35, the process proceeds to step S40.

In step S40, the determination part 15 increments the count value j by 1 and returns the process to step S38. Then, the processes of steps S38 to S40 are repeated until the count value j becomes equal to or larger than the number of second pixel groups found in step S35.

On the other hand, in a case where it is decided in step S39 that the count value j is equal to or larger than the number of second pixel groups found in step S35, the process proceeds to step S41.

In step S41, the determination part 15 decides whether the count value i is equal to or larger than the number of first pixel groups found in step S32. In a case where it is decided in step S41 that the count value i is not equal to or larger than the number of first pixel groups found in step S32, the process proceeds to step S42.

In step S42, the determination part 15 increments the count value i by 1 and returns the process to step S35. Then, the processes of steps S35 to S42 are repeated until the count value i becomes equal to or larger than the number of first pixel groups found in step S32.

On the other hand, in a case where it is decided in step S41 that the count value i is equal to or larger than the number of first pixel groups found in step S32, the process proceeds to step S43.

In step S43, the determination part 15 supplies the projection period of the processing target pulse light and the pair information of all the pairs determined in step S38 to the distance detection part 16, and the process proceeds to step S44.

On the other hand, in a case where it is decided in step S33 that the first pixel group has not been found, or in a case where it is decided in step S36 that the second pixel group has not been found, the pair of the first pixel group and the second pixel group are not determined, and the process proceeds to step S44.

In step S44, the determination part 15 decides whether the last pulse light of the processing target pulse light group has been set to the processing target pulse light. In a case where it is decided in step S44 that the last pulse light has not yet been set to the processing target pulse light, the process proceeds to step S45.

In step S45, the determination part 15 newly sets the pulse light next to the current processing target pulse light to the processing target pulse light, and the process returns to step S32. Then, the processes of steps S32 to S45 are repeated until the last pulse light of the processing target pulse light group is set to the processing target pulse light.

On the other hand, in a case where it is decided in step S44 that the last pulse light of the processing target pulse light group is set to the processing target pulse light, the process returns to step S13 in FIG. 3 and proceeds to step S14.

(Example of Pair of First Pixel Group and Second Pixel Group Determined by First Example of Pair Determination Processing)

Figure 5:
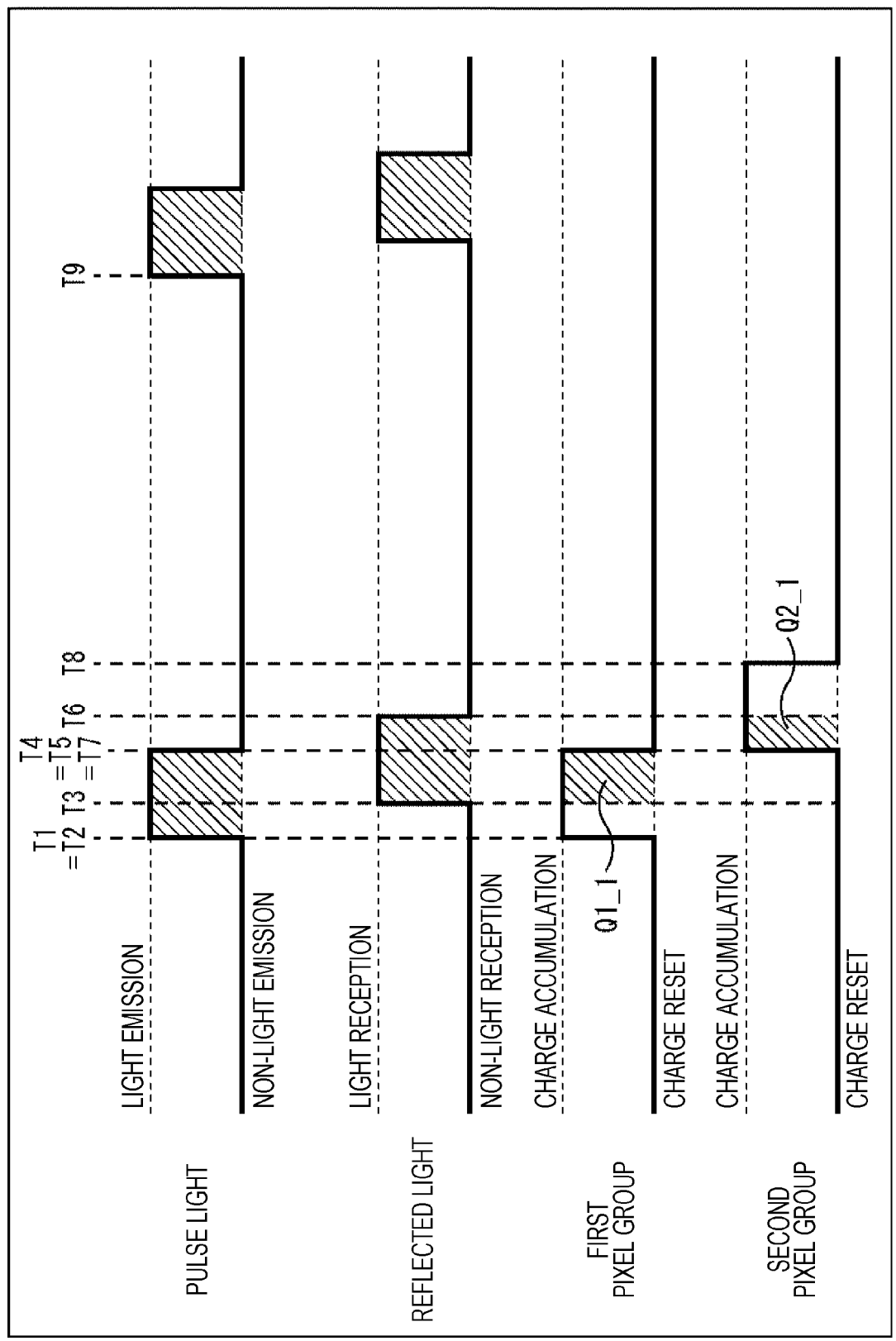
FIG. 5 is an example of a timing chart in the first example of the pair determination processing.

FIG. 5 is a timing chart showing the charge accumulation period or the like of the pair of the first pixel group and the second pixel group determined by the first example of the pair determination processing in a case where the imaging device 13 is apart from the subject (target object) in the pixel of the first pixel group. Furthermore, FIG. 6 is a timing chart showing the charge accumulation period or the like of the pair of the first pixel group and the second pixel group determined by the first example of the pair determination processing in a case where the distance from the imaging device 13 to the subject is 0 [m].

Figure 6:
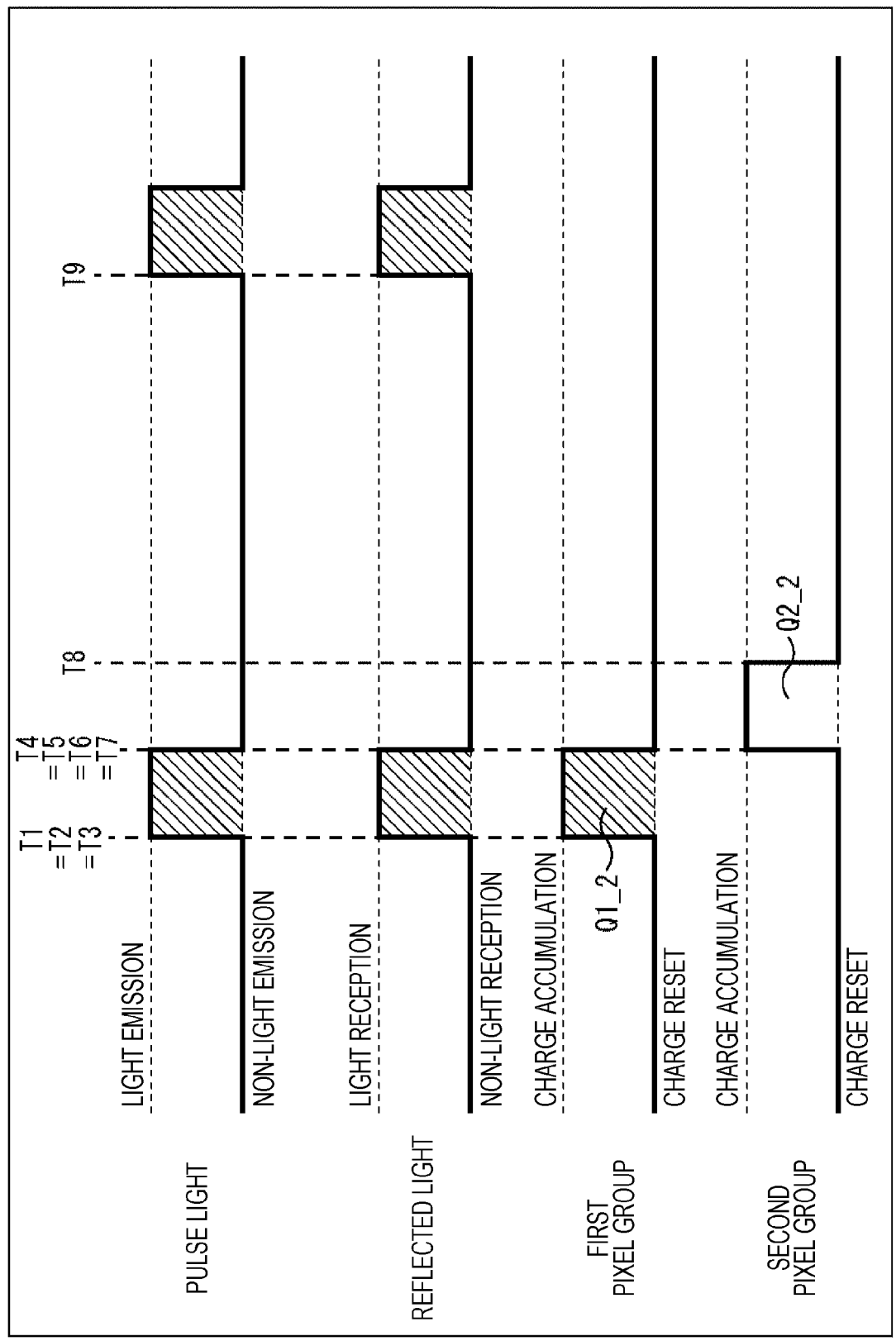
FIG. 6 is another example of a timing chart in the first example of the pair determination processing.

As shown in FIGS. 5 and 6, in the first example of the pair determination processing, the charge accumulation start time T1 of the first pixel group is the same as the light projection start time T2, and the charge accumulation end time T7 of the first pixel group and the charge accumulation start time T4 of the second pixel group are the same as the light projection end time T5.

In this case, in a case where the charge amount accumulated in the pixel of the first pixel group due to the reception of the reflected light from the subject of the processing target pulse light is Q1, and the charge amount accumulated in the pixel of the second pixel group is Q2, the charge amount accumulated in a case where it is assumed that all the reflected light of the pulse light during the light projection time (T5−T2) is received by the pixel of the second pixel group is (Q1+Q2). Furthermore, the actual charge accumulation time of the pixel of the second pixel group is the time (T6−T5) from the light projection end time T5 to the light reception end time T6. Accordingly, the time (T6−T5) is represented by the following equation (1).

$$(T6-T5)=(T5-T2)\times Q2/(Q1+Q2) \qquad (1)$$

Therefore, the distance detection part 16 can obtain the time (T6−T5) on the basis of the light projection start time T2 and the light projection end time T5 as well as the charge amount Q1 and the charge amount Q2.

Here, the time (T3−T2) from the light projection start time T2 to the light reception start time T3 is proportional to the distance between the imaging device 13 and the subject (target object). Specifically, the distance D [m] between the imaging device 13 and the subject (target object) can be represented by the following equation (2) using the speed of light c=3×10^8 [m/s].

$$D[m]=0.5\times c\times(T3-T2) \qquad (2)$$

Furthermore, the time (T3−T2) from the light projection start time T2 to the light reception start time T3 coincides with the time (T6−T5) from the light projection end time T5 to the light reception end time T6. Accordingly, the distance D [m] can also be represented by the following equation (3).

$$D[m]=0.5\times c\times(T6-T5) \qquad (3)$$

Therefore, the distance detection part 16 obtains the distance D [m] by the equation (3) using the time (T6−T5) obtained by the equation (1) described above.

As a result, as shown in FIG. 5, in a case where the charge amount Q1 is the charge amount Q1_1 and the charge amount Q2 is the charge amount Q2_1, the distance D [m] obtained by the distance detection part 16 is represented by the following equation (4).

$$D[m]=0.5\times c\times((T5-T2)\times Q2\_1/(Q1\_1+Q2\_1)) \qquad (4)$$

In the case of FIG. 5, since the imaging device 13 is apart from the subject in the pixel of the first pixel group, the light reception start time T3 and the light projection start time T2 of the processing target pulse light are different. Accordingly, Q2_1 is not 0. Therefore, the distance D [m] obtained by the equation (4) is not 0.

On the other hand, as shown in FIG. 6, in a case where the charge amount Q1 is the charge amount Q1_2 and the charge amount Q2 is the charge amount Q2_2, the distance D [m] obtained by the distance detection part 16 is represented by the following equation (5).

$$D[m]=0.5\times c\times((T5-T2)\times Q2\_2/(Q1\_2+Q2\_2)) \qquad (5)$$

In the case of FIG. 6, since the imaging device 13 is not apart from the subject in the pixel of the first pixel group, the light reception start time T3 and the light projection start time T2 of the processing target pulse light are the same. Accordingly, Q2_2 is 0. Therefore, the distance D [m] obtained by the equation (5) is 0.

(Explanation of Second Example of Pair Determination Processing)

Figure 7:
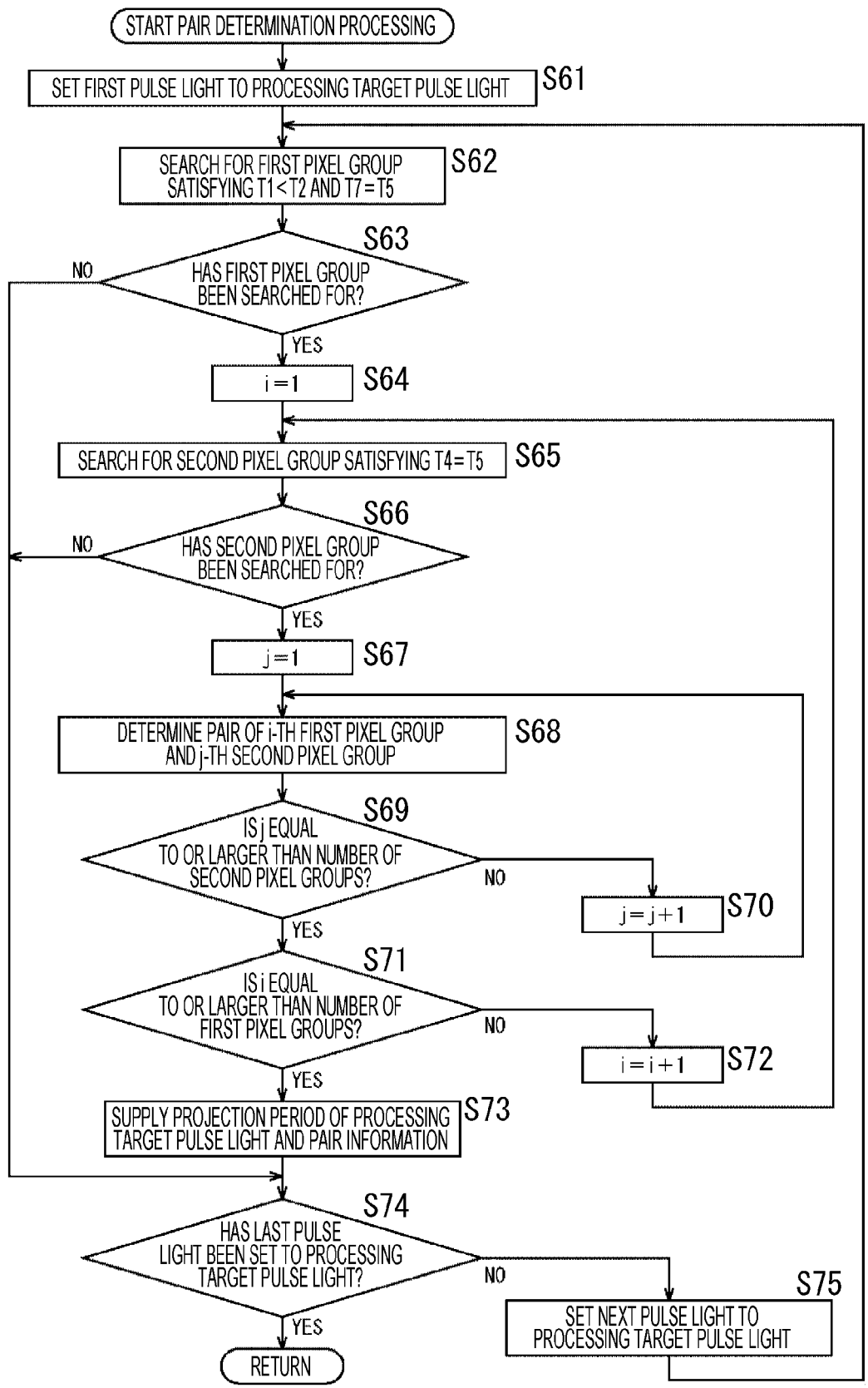
FIG. 7 is a flowchart explaining a second example of the pair determination processing.

FIG. 7 is a flowchart explaining a second example of pair determination processing in step S13 of FIG. 3.

In step S61 of FIG. 7, the determination part 15 sets the first pulse light of the processing target pulse light group to the processing target pulse light.

In step S62, the determination part 15 searches for the first pixel group in which the charge accumulation start time T1 is earlier than the light projection start time T2 and the charge accumulation end time T7 is the same as the light projection end time T5.

The processes of steps S63 to S75 are similar to the processes of steps S33 to S45 of FIG. 4, and the description thereof will be omitted.

(Example of Pair of First Pixel Group and Second Pixel Group Determined by Second Example of Pair Determination Processing)

Figure 8:
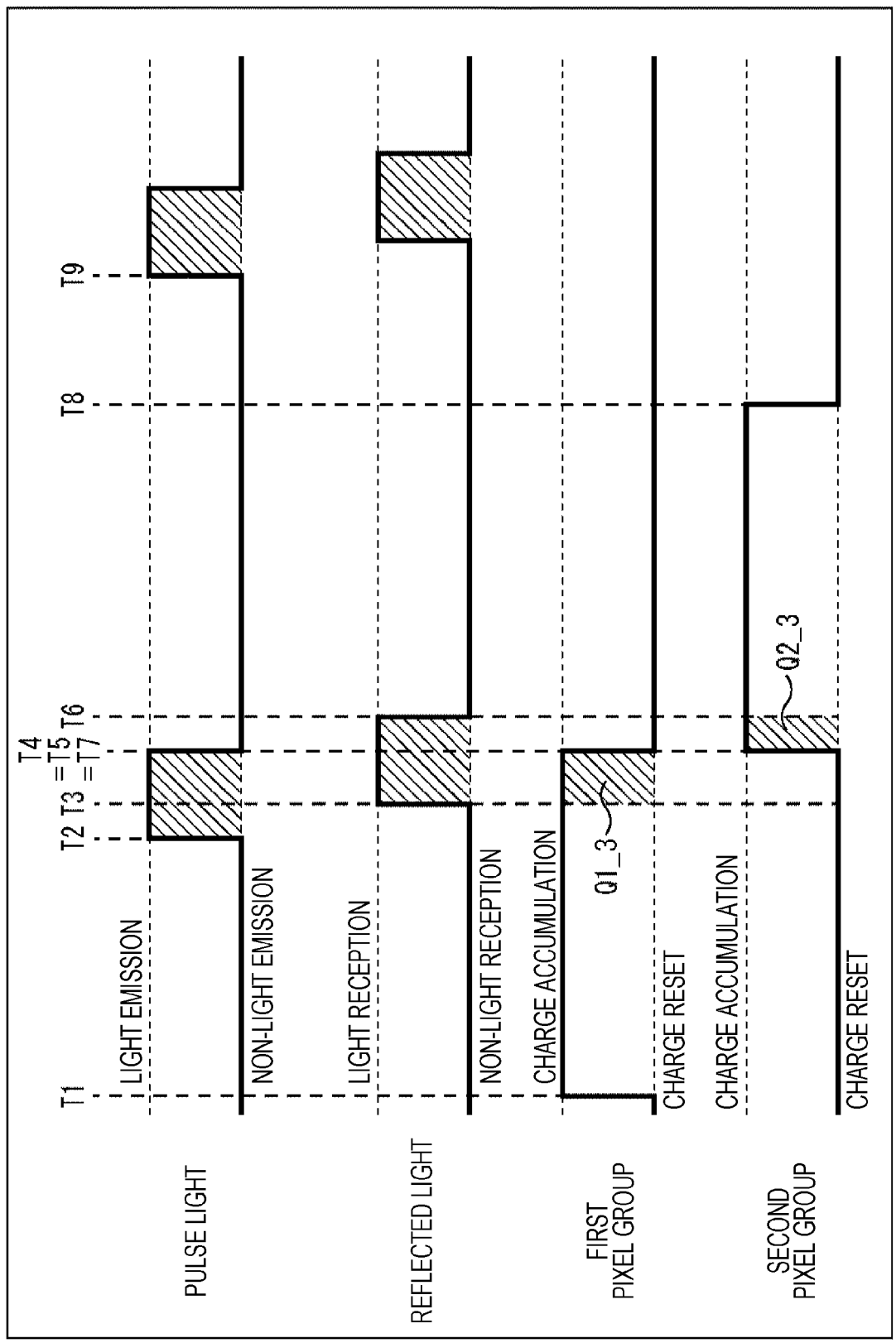
FIG. 8 is an example of a timing chart in the second example of the pair determination processing.

FIG. 8 is a timing chart showing the charge accumulation period or the like of the pair of the first pixel group and the second pixel group determined by the second example of the pair determination processing in a case where the imaging device 13 is apart from the subject (target object) in the pixel of the first pixel group. Furthermore, FIG. 9 is a timing chart showing the charge accumulation period or the like of the pair of the first pixel group and the second pixel group determined by the second example of the pair determination processing in a case where the distance from the imaging device 13 to the subject is 0 [m].

Figure 9:
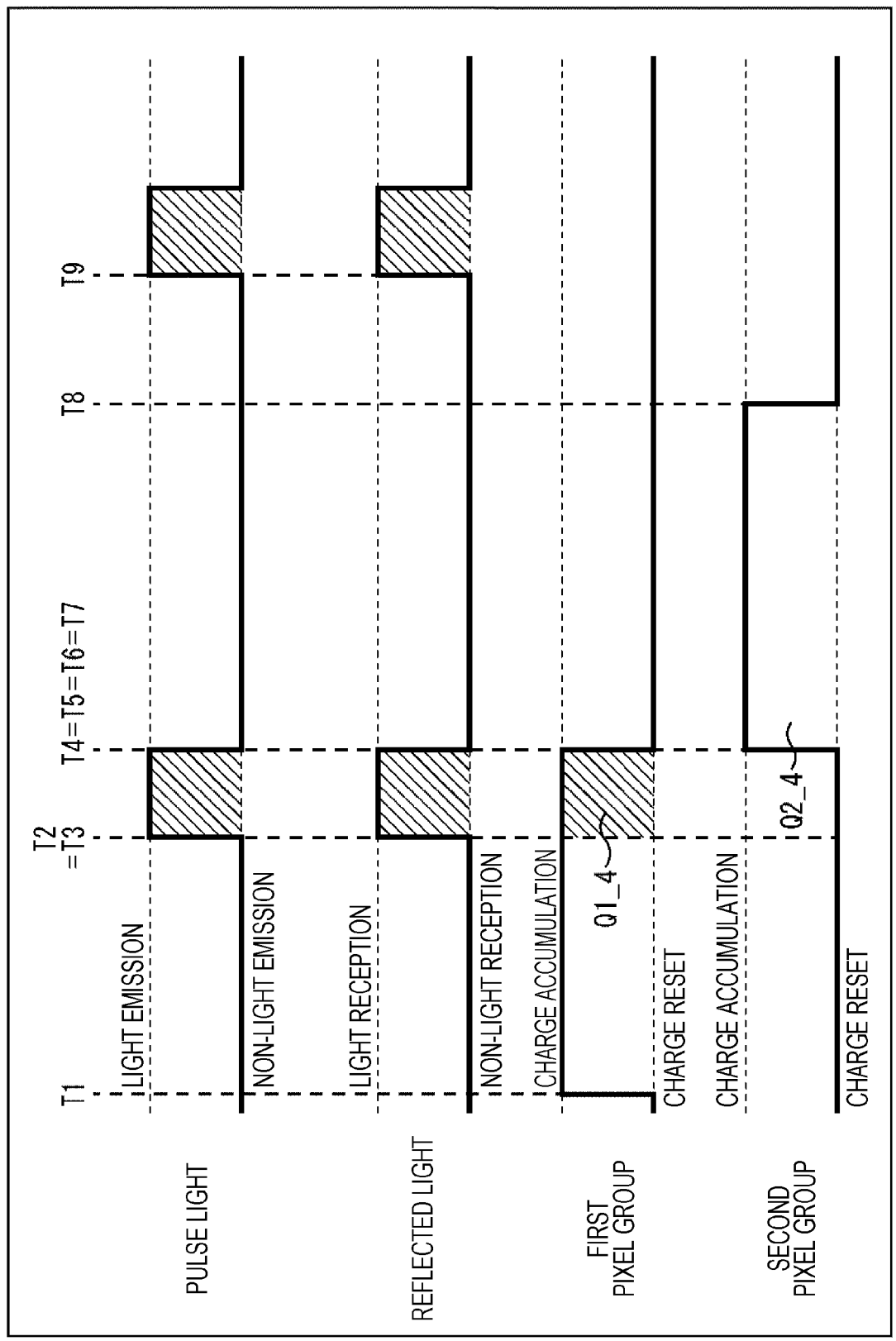
FIG. 9 is another example of a timing chart in the second example of the pair determination processing.

As shown in FIGS. 8 and 9, in the second example of the pair determination processing, the charge accumulation start time T1 of the first pixel group is earlier than the light projection start time T2, and the charge accumulation end time T7 of the first pixel group and the charge accumulation start time T4 of the second pixel group are the same as the light projection end time T5.

In this case, the above equation (1) is satisfied. Accordingly, the distance detection part 16 obtains the distance D [m] by the equation (3) using the time (T6−T5) obtained by the equation (1) described above.

As a result, as shown in FIG. 8, in a case where the charge amount Q1 is the charge amount Q1_3 and the charge amount Q2 is the charge amount Q2_3, the distance D [m] obtained by the distance detection part 16 is represented by the following equation (6).

$$D[m]=0.5\times c\times((T5-T2)\times Q2\_3(Q1\_3+Q2\_3)) \qquad (6)$$

In the case of FIG. 8, since the imaging device 13 is apart from the subject in the pixel of the first pixel group, the light reception start time T3 and the light projection start time T2 of the processing target pulse light are different. Accordingly, Q2_3 is not 0. Therefore, the distance D [m] obtained by the equation (6) is not 0.

On the other hand, as shown in FIG. 9, in a case where the charge amount Q1 is the charge amount Q1_4 and the charge amount Q2 is the charge amount Q2_4, the distance D [m] obtained by the distance detection part 16 is represented by the following equation (7).

$$D[m]=0.5\times c\times((T5-T2)\times Q2\_4/(Q1\_4+Q2\_4)) \qquad (7)$$

In the case of FIG. 9, since the imaging device 13 is not apart from the subject in the pixel of the first pixel group, the light reception start time T3 and the light projection start time T2 of the processing target pulse light are the same. Accordingly, Q2_4 is 0. Therefore, the distance D [m] obtained by the equation (7) is 0.

(Explanation of Third Example of Pair Determination Processing)

Figure 10:
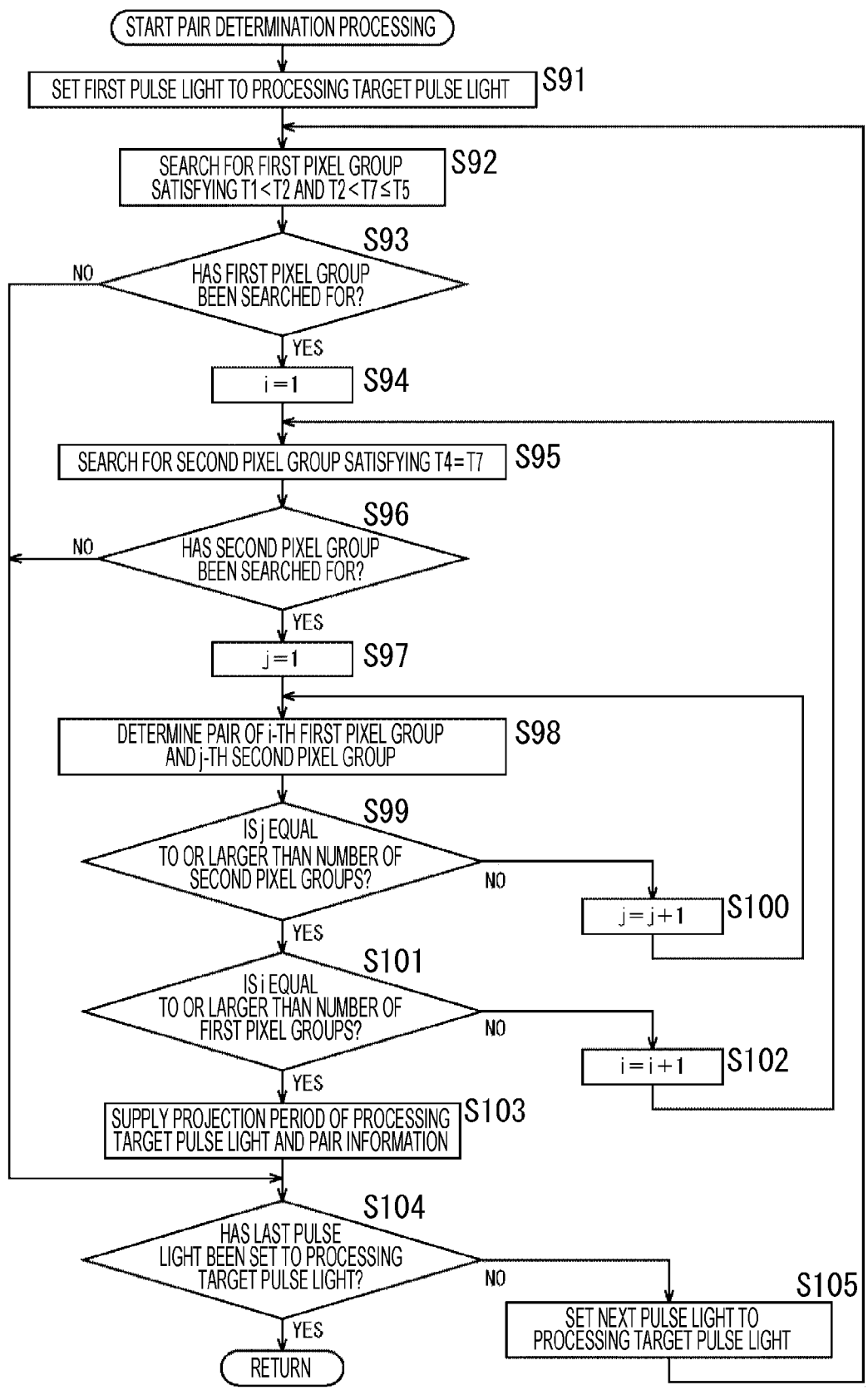
FIG. 10 is a flowchart explaining a third example of the pair determination processing.

FIG. 10 is a flowchart explaining a third example of pair determination processing in step S13 of FIG. 3.

In step S91 of FIG. 10, the determination part 15 sets the first pulse light of the processing target pulse light group to the processing target pulse light.

In step S92, the determination part 15 searches for the first pixel group in which the charge accumulation start time T1 is earlier than the light projection start time T2, and the charge accumulation end time T7 is later than the light projection start time T2, and is the same as or earlier than the light projection end time T5.

In step S93, the determination part 15 decides whether the first pixel group has been found as a result of the process of step S92. In a case where it is decided in step S93 that the first pixel group has been found, the determination part 15 determines the found first pixel group, that is, a pixel group in which the charge accumulation period includes at least part of the projection period of the processing target pulse light as the first pixel group.

In step S94, the determination part 15 sets the count value i to 1.

In step S95, the determination part 15 searches for the second pixel group in which the charge accumulation start time T4 is the same as the charge accumulation end time T7 of the i-th first pixel group among the one or more first pixel groups found in step S92.

The processes of steps S96 to S105 are similar to the processes of steps S36 to S45 of FIG. 4, and the description thereof will be omitted.

(Example of Pair of First Pixel Group and Second Pixel Group Determined by Third Example of Pair Determination Processing)

Figure 11:
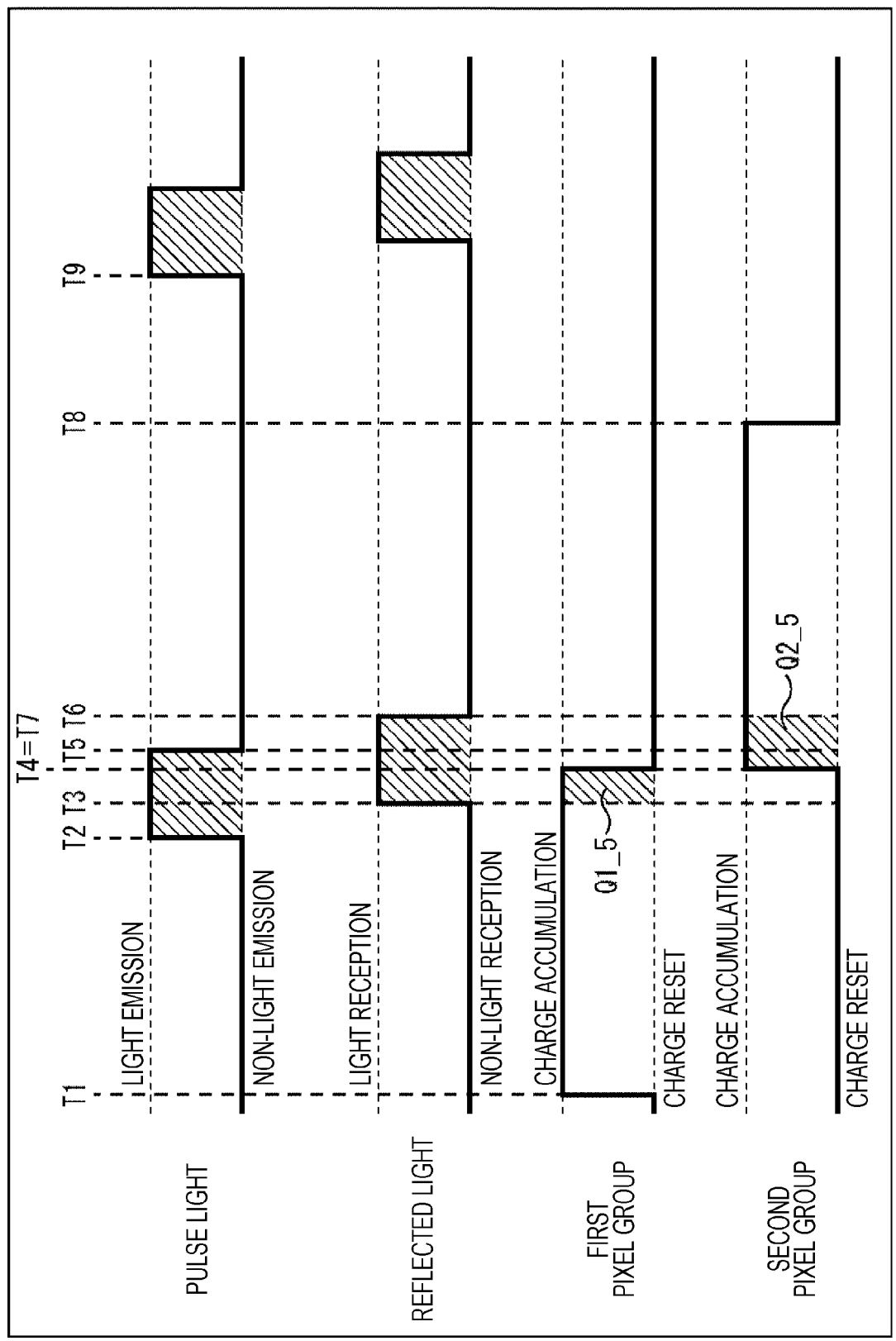
FIG. 11 is an example of a timing chart in the third example of the pair determination processing.

FIG. 11 is a timing chart showing the charge accumulation period or the like of the pair of the first pixel group and the second pixel group determined by the third example of the pair determination processing in a case where the imaging device 13 is apart from the subject (target object) in the pixel of the first pixel group. Furthermore, FIG. 12 is a timing chart showing the charge accumulation period or the like of the pair of the first pixel group and the second pixel group determined by the third example of the pair determination processing in a case where the distance from the imaging device 13 to the subject is 0 [m].

Figure 12:
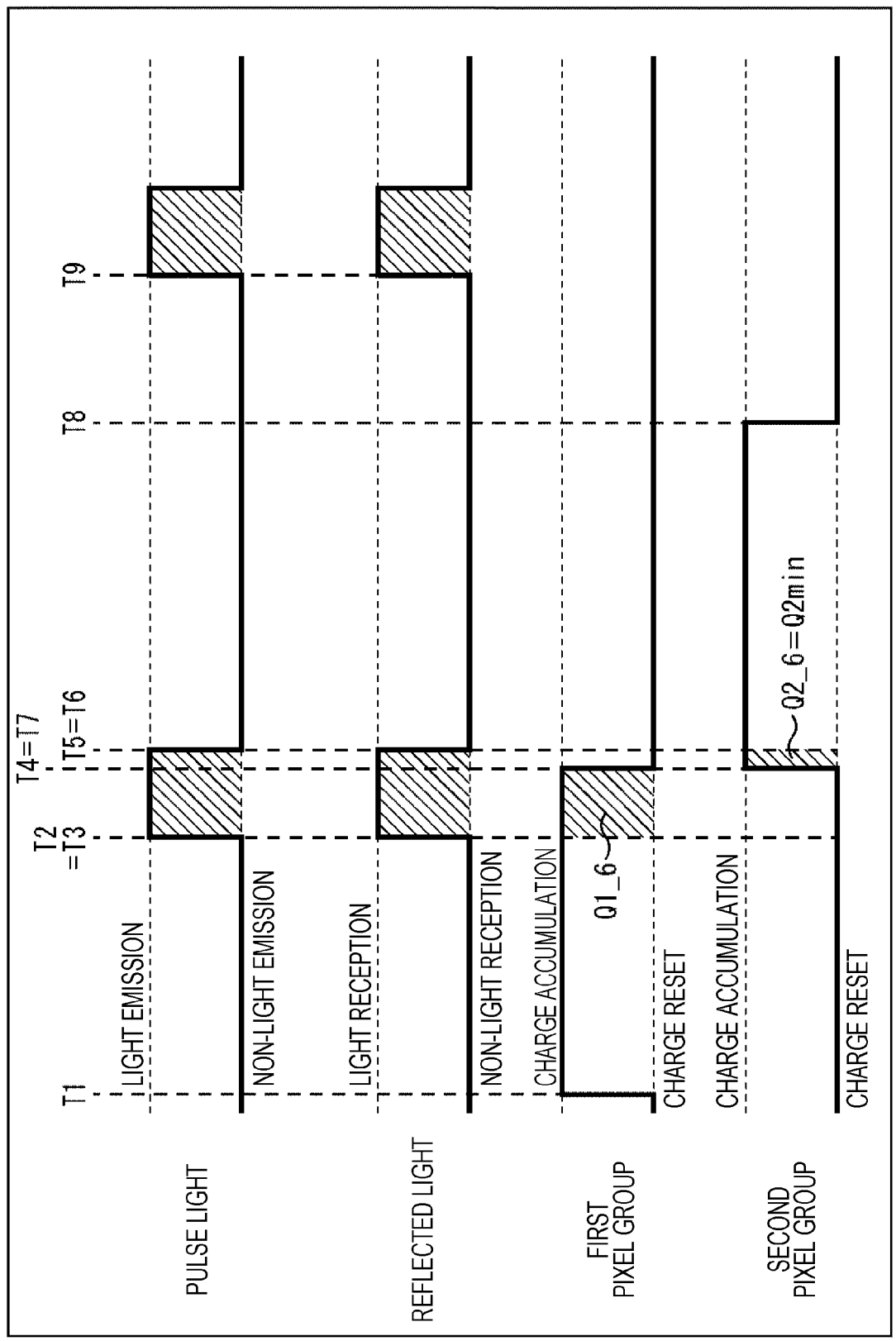
FIG. 12 is another example of a timing chart in the third example of the pair determination processing.

As shown in FIGS. 11 and 12, in the third example of the pair determination processing, the charge accumulation start time T1 of the first pixel group is earlier than the light projection start time T2 and the charge accumulation end time T7 is later than the light projection start time T2 and is the same as or earlier than the light projection end time T5. Furthermore, the charge accumulation start time T4 of the second pixel group is the same as the charge accumulation end time T7 of the first pixel group.

In this case, in a case where the charge amount accumulated in the pixel of the first pixel group due to the reception of the reflected light from the subject of the processing target pulse light is Q1, and the charge amount accumulated in the pixel of the second pixel group is Q2, the charge amount accumulated in a case where it is assumed that all the reflected light of the pulse light during the light projection time (T5−T2) is received by the pixel of the second pixel group is (Q1+Q2).

Furthermore, the actual charge accumulation time of the pixel of the second pixel group is the time (T6−T4) from the charge accumulation start time T4 of the second pixel group to the light reception end time T6. Accordingly, assuming that the amount of charge accumulated in the pixel of the second pixel group during the time (T5−T4) from the charge accumulation start time T4 to the light projection end time T5 is Q2min, the time (T6−T5) is represented by the following equation (8).

$$(T6-T5)=(T5-T2)\times(Q2-Q2min)/(Q1+Q2) \quad (8)$$

Here, Q2min is represented by the following equation (9) regardless of the distance D [m] between the imaging device 13 and the subject.

$$Q2min=(Q1+Q2)\times(T5-T4)/(T5-T2) \quad (9)$$

Accordingly, the distance detection part 16 can obtain the time (T6−T5) on the basis of the light projection start time T2, the light projection end time T5, the charge accumulation start time T4 of the second pixel, the charge amount Q1, and the charge amount Q2.

The distance detection part 16 obtains the distance D [m] by the equation (3) using the time (T6−T5) obtained as described above.

As a result, as shown in FIG. 11, in a case where the charge amount Q1 is the charge amount Q1_5 and the charge amount Q2 is the charge amount Q2_5, the distance D [m] obtained by the distance detection part 16 is represented by the following equation (10).

$$D[m]=0.5\times c\times(T5-T2)\times(Q2\_5-Q2min)/(Q1\_5+Q2\_5) \quad (10)$$

In the case of FIG. 11, since the imaging device 13 is apart from the subject in the pixel of the first pixel group, the projection end time T5 of the processing target pulse light and the light reception end time T6 are different. Accordingly, the charge amount Q2_5 is not the same as Q2min. Therefore, the distance D [m] obtained by the equation (10) is not 0.

On the other hand, as shown in FIG. 12, in a case where the charge amount Q1 is the charge amount Q1_6 and the charge amount Q2 is the charge amount Q2_6, the distance D [m] obtained by the distance detection part 16 is represented by the following equation (11).

$$D[m]=0.5\times c\times(T5-T2)\times(Q2\_6-Q2min)/(Q1\_6+Q2\_6) \quad (11)$$

In the case of FIG. 12, since the imaging device 13 is not apart from the subject in the pixel of the first pixel group, the projection end time T5 of the processing target pulse light and the light reception end time T6 are the same. Accordingly, the charge amount Q2_6 is the same as Q2min. Therefore, the distance D [m] obtained by the equation (11) is 0.

(Explanation of Fourth Example of Pair Determination Processing)

Figure 13:
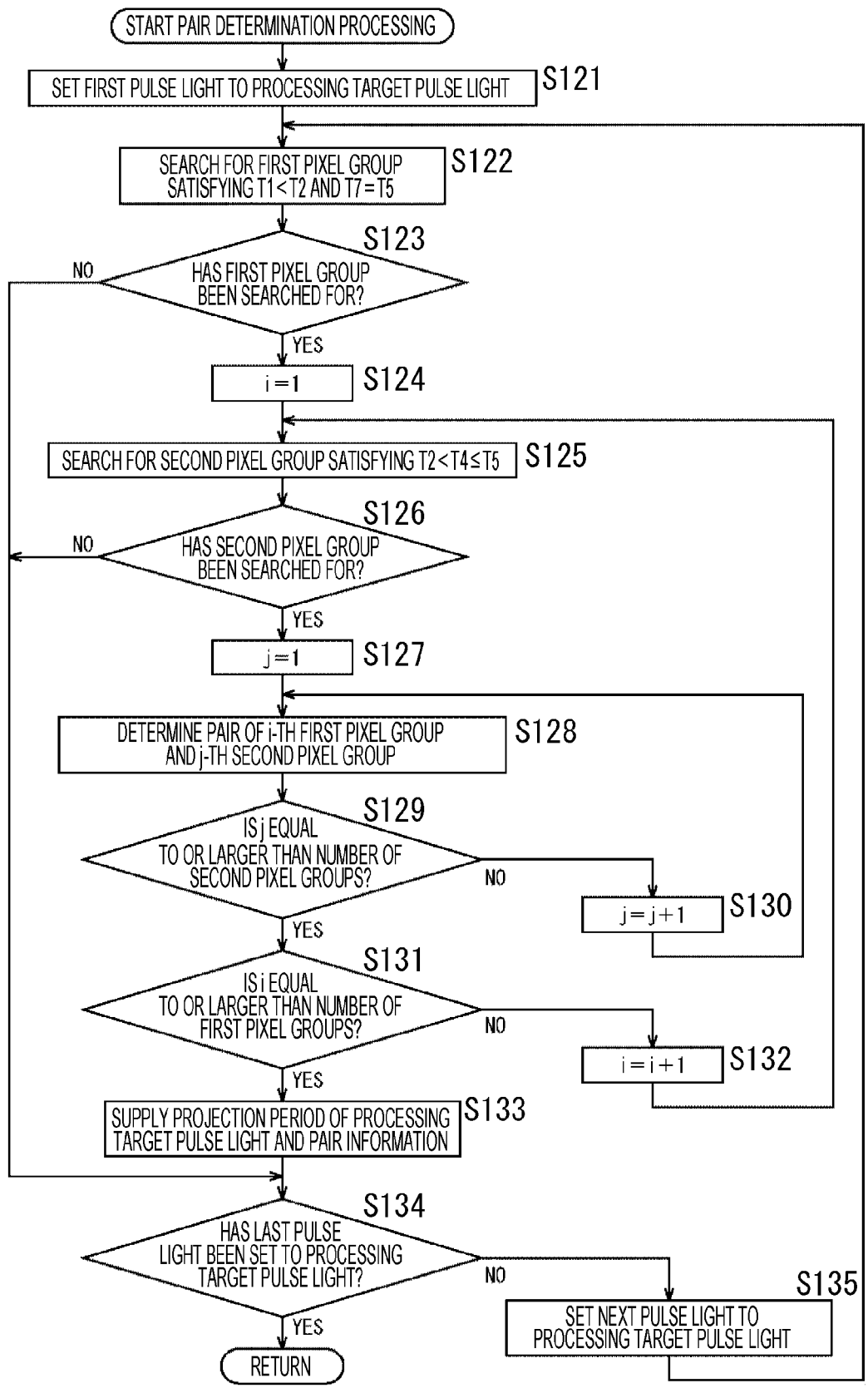
FIG. 13 is a flowchart explaining a fourth example of the pair determination processing.

FIG. 13 is a flowchart explaining a fourth example of pair determination processing in step S13 of FIG. 3.

The processes of steps S121 to S124 of FIG. 13 are similar to the processes of steps S61 to S64 of FIG. 7.

In step S125, the determination part 15 searches for the second pixel group in which the charge accumulation start time T4 is later than the light projection start time T2 and is the same as or earlier than the light projection end time T5.

The processes of steps S126 to S135 are similar to the processes of steps S36 to S45 of FIG. 4, and the description thereof will be omitted.

(Example of Pair of First Pixel Group and Second Pixel Group Determined by Fourth Example of Pair Determination Processing)

Figure 14:
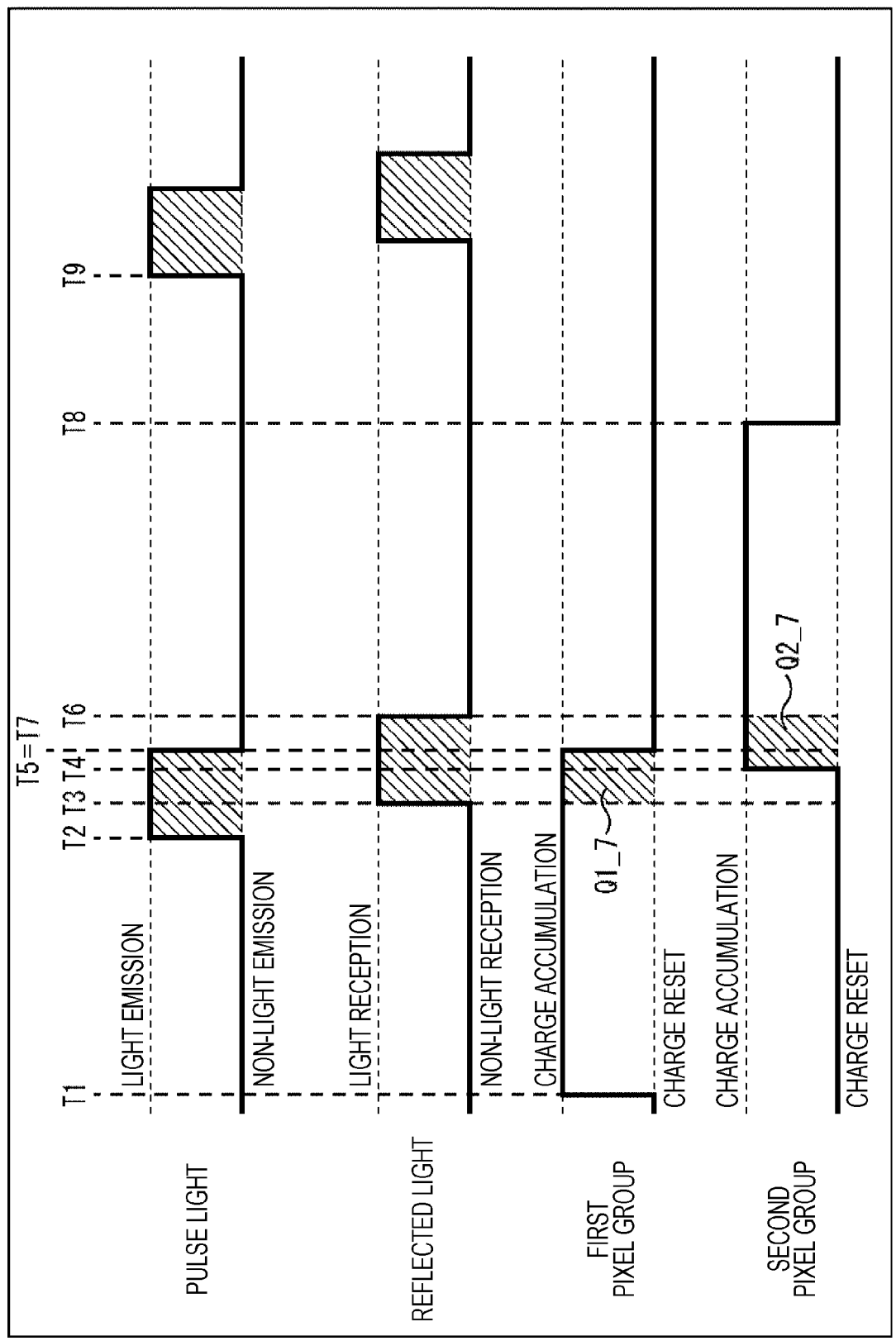
FIG. 14 is an example of a timing chart in the fourth example of the pair determination processing.

FIG. 14 is a timing chart showing the charge accumulation period or the like of the pair of the first pixel group and the second pixel group determined by the fourth example of the pair determination processing in a case where the imaging device 13 is apart from the subject (target object) in the pixel of the first pixel group. Furthermore, FIG. 15 is a timing chart showing the charge accumulation period or the like of the pair of the first pixel group and the second pixel group determined by the fourth example of the pair determination processing in a case where the distance from the imaging device 13 to the subject is 0 [m].

Figure 15:
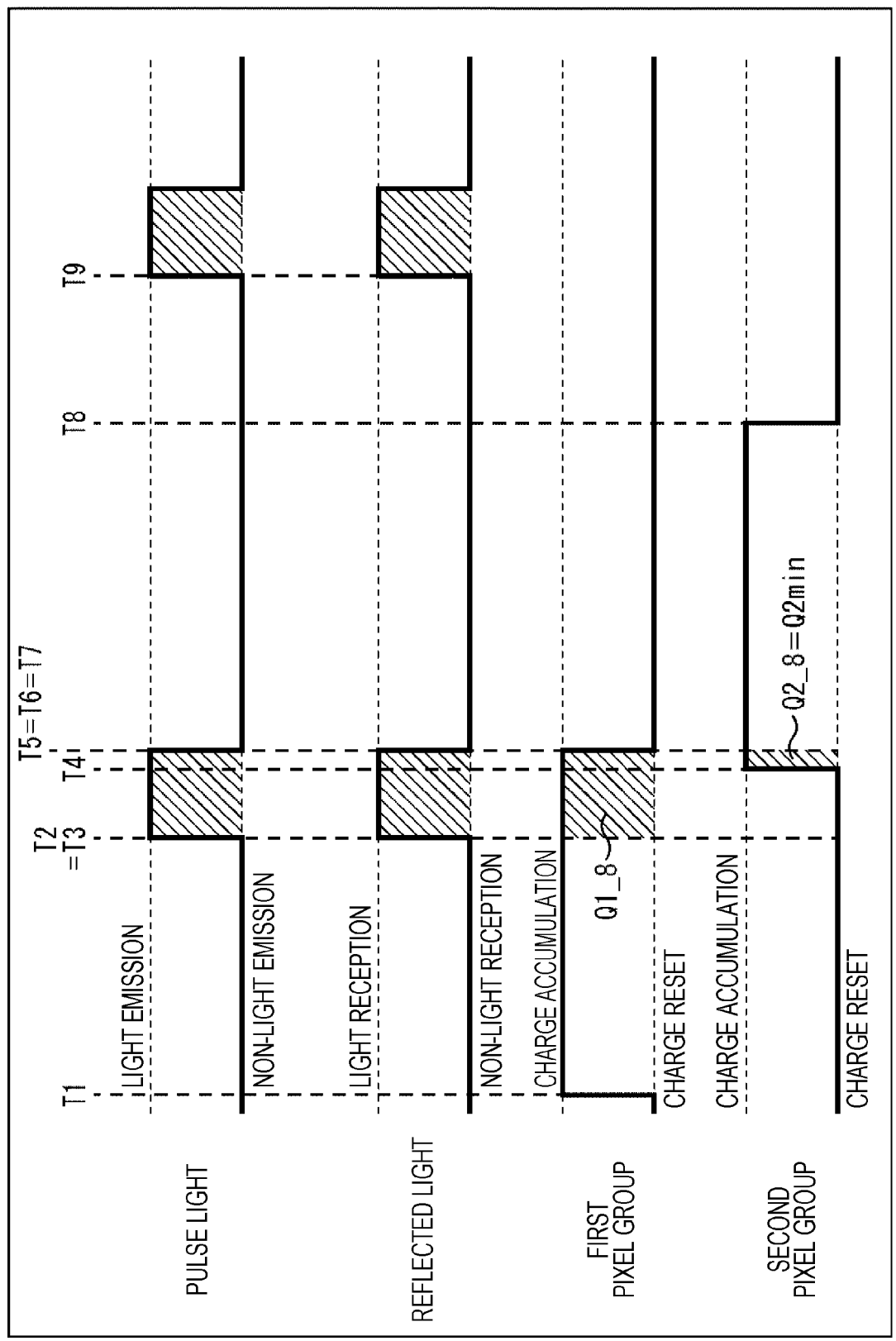
FIG. 15 is another example of a timing chart in the fourth example of the pair determination processing.

As shown in FIGS. 14 and 15, in the fourth example of the pair determination processing, the charge accumulation start time T1 of the first pixel group is earlier than the light projection start time T2 and the charge accumulation end time T7 is the same as the light projection end time T5. Furthermore, the charge accumulation start time T4 of the second pixel group is later than the light projection start time T2 and is the same as or earlier than the light projection end time T5.

In this case, during time from the charge accumulation start time T4 of the second pixel group to the light projection end time T5, the charge is accumulated in both pixels of the first pixel group and the second pixel group due to reception of the reflected light from the subject of the processing target pulse light. Accordingly, in a case where the charge amount accumulated in the pixel of the first pixel group due to the reception of the reflected light from the subject of the processing target pulse light is Q1, and the charge amount accumulated in the pixel of the second pixel group is Q2, the charge amount accumulated in a case where it is assumed that all the reflected light of the pulse light during the light projection time (T5−T2) is received by the pixel of the second pixel group is (Q1+Q2−Q2min).

Furthermore, the actual charge accumulation time of the pixel of the second pixel group is the time (T6−T4) from the charge accumulation start time T4 of the second pixel group to the light reception end time T6. Accordingly, time (T6−T5) is represented by the following equation (12).

$$(T6-T5)=(T5-T2)\times(Q2-Q2min)(Q1+Q2-Q2min) \quad (12)$$

Here, Q2min is represented by the following equation (13) regardless of the distance D [m] between the imaging device 13 and the subject.

$$Q2min = (Q1 + Q2 - Q2min)\times(T5 - T4)/(T5 - T2) = \\ (Q1 + Q2)\times(T5 - T4)/(2\times T5 - T4 - T2) \quad (13)$$

Accordingly, the distance detection part 16 can obtain the time (T6−T5) on the basis of the light projection start time T2, the light projection end time T5, the charge accumulation start time T4 of the second pixel, the charge amount Q1, and the charge amount Q2.

The distance detection part 16 obtains the distance D [m] by the equation (3) using the time (T6−T5) obtained as described above.

As a result, as shown in FIG. 14, in a case where the charge amount Q1 is the charge amount Q1_7 and the charge amount Q2 is the charge amount Q2_7, the distance D [m] obtained by the distance detection part 16 is represented by the following equation (14).

$$D[m]=0.5\times c\times(T5-T2)\times(Q2\_7-Q2min)/(Q1\_7+Q2\_7-Q2min) \quad (14)$$

In the case of FIG. 14, since the imaging device 13 is apart from the subject in the pixel of the first pixel group, the projection end time T5 of the processing target pulse light and the light reception end time T6 are different. Accordingly, the charge amount Q2_7 is not the same as Q2min. Therefore, the distance D [m] obtained by the equation (14) is not 0.

On the other hand, as shown in FIG. 15, in a case where the charge amount Q1 is the charge amount Q1_8 and the charge amount Q2 is the charge amount Q2_8, the distance D [m] obtained by the distance detection part 16 is represented by the following equation (15).

$$D[m]=0.5\times c\times(T5-T2)\times(Q2\_8-Q2min)/(Q1\_8+Q2\_8-Q2min) \quad (15)$$

In the case of FIG. 15, since the imaging device 13 is not apart from the subject in the pixel of the first pixel group, the projection end time T5 of the processing target pulse light and the light reception end time T6 are the same. Accordingly, the charge amount Q2_8 is the same as Q2min. Therefore, the distance D [m] obtained by the equation (15) is 0.

(Explanation of Fifth Example of Pair Determination Processing)

Figure 16:
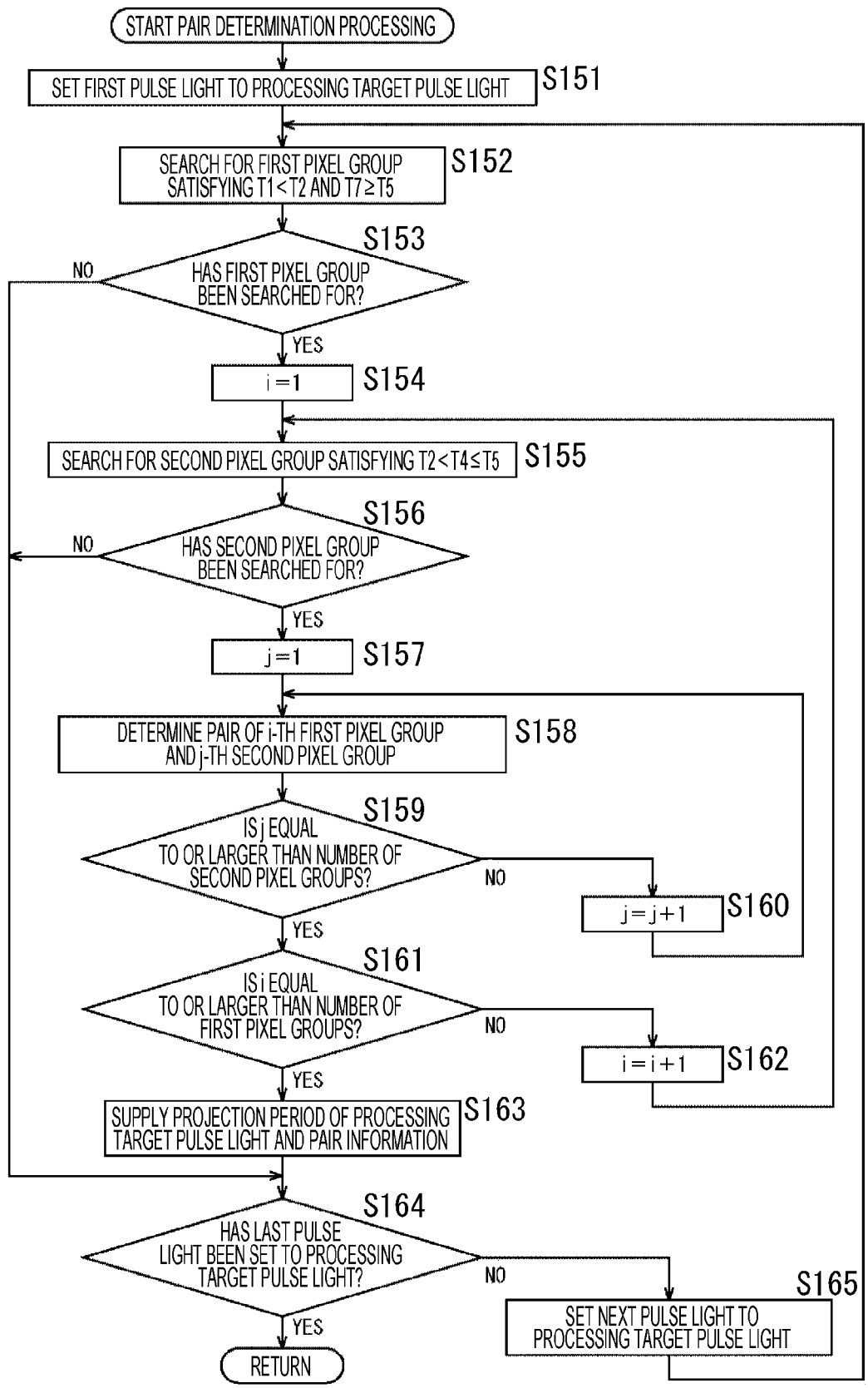
FIG. 16 is a flowchart explaining a fifth example of the pair determination processing.

FIG. 16 is a flowchart explaining a fifth example of pair determination processing in step S13 of FIG. 3.

In step S151 of FIG. 16, the determination part 15 sets the first pulse light of the processing target pulse light group to the processing target pulse light.

In step S152, the determination part 15 searches for the first pixel group in which the charge accumulation start time T1 is earlier than the light projection start time T2, and the charge accumulation end time T7 is the same as or later than the light projection end time T5.

The processes of steps S153 to S165 are similar to the processes of steps S123 to S135 of FIG. 13, and the description thereof will be omitted.

(Example of Pair of First Pixel Group and Second Pixel Group Determined by Fifth Example of Pair Determination Processing)

Figure 17:
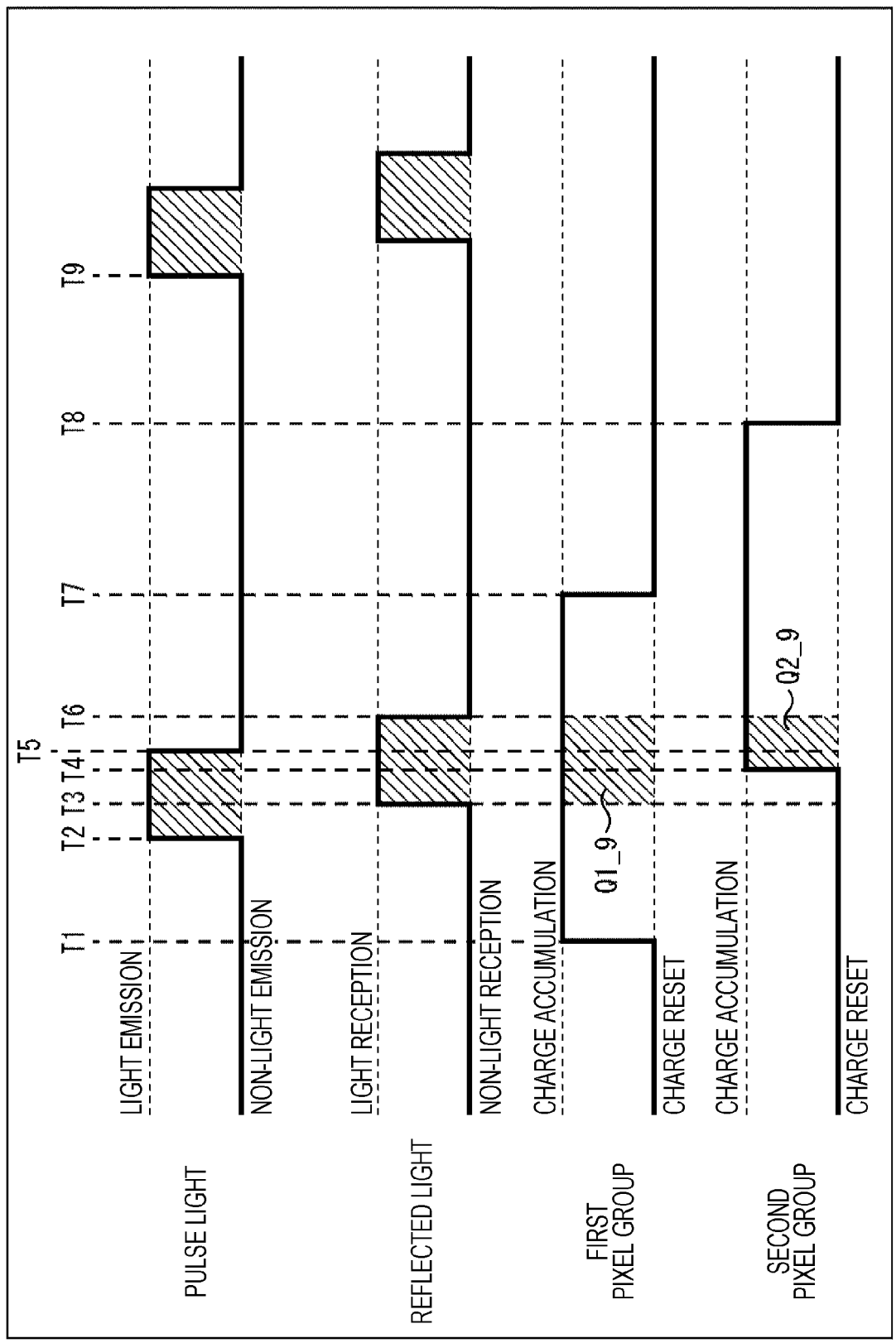
FIG. 17 is an example of a timing chart in the fifth example of the pair determination processing.

FIG. 17 is a timing chart showing the charge accumulation period or the like of the pair of the first pixel group and the second pixel group determined by the fifth example of the pair determination processing in a case where the imaging device 13 is apart from the subject (target object) in the pixel of the first pixel group. Furthermore, FIG. 18 is a timing chart showing the charge accumulation period or the like of the pair of the first pixel group and the second pixel group determined by the fifth example of the pair determination processing in a case where the distance from the imaging device 13 to the subject is 0 [m].

Figure 18:
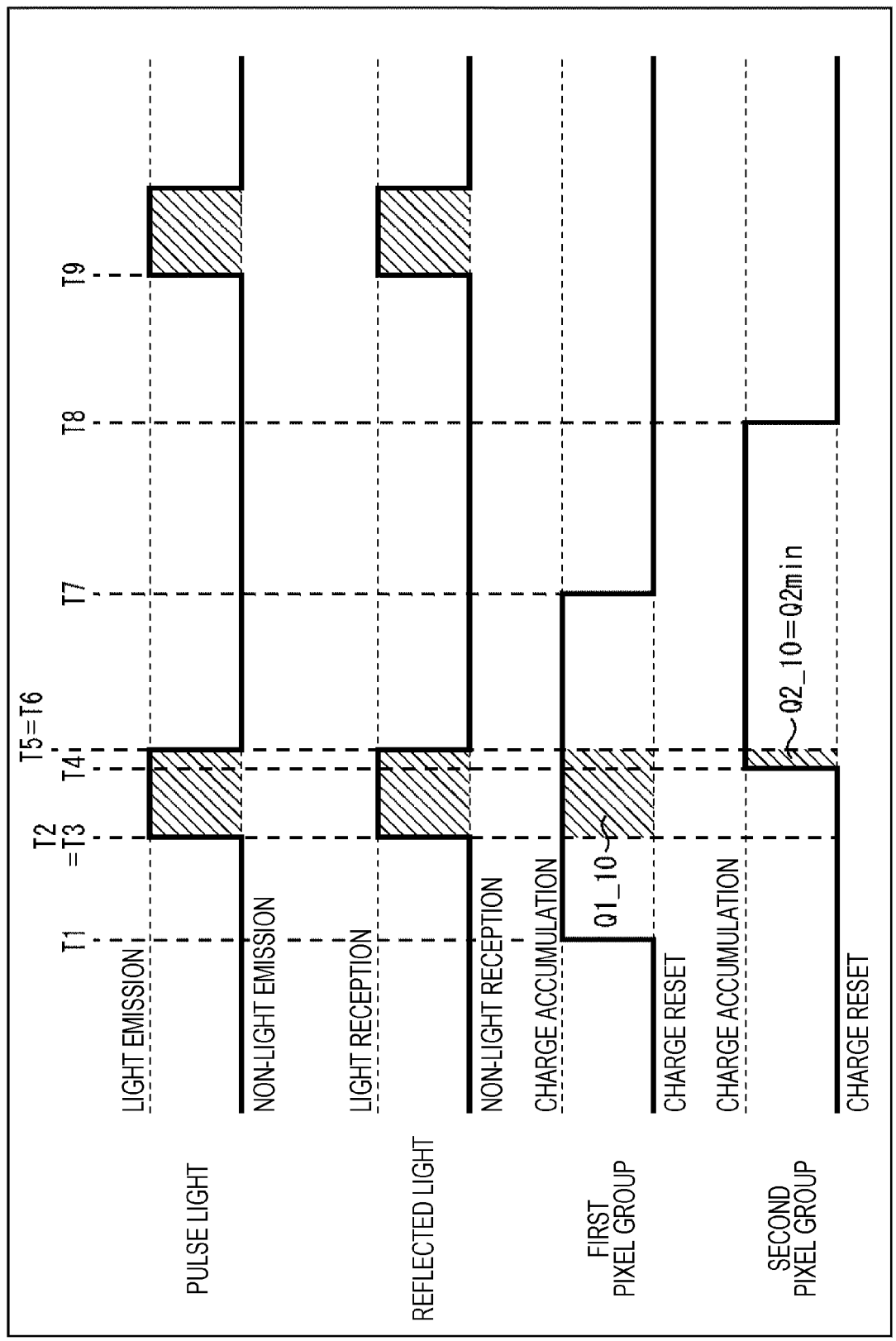
FIG. 18 is another example of a timing chart in the fifth example of the pair determination processing.

As shown in FIGS. 17 and 18, in the fifth example of the pair determination processing, the charge accumulation start time T1 of the first pixel group is earlier than the light projection start time T2 and the charge accumulation end time T7 is the same as or later than the light projection end time T5. Furthermore, the charge accumulation start time T4 of the second pixel group is later than the light projection start time T2 and is the same as or earlier than the light projection end time T5.

In this case, the pixel of the first pixel group receives all reflected light of the pulse light during the light projection time (T5−T2). Furthermore, the actual charge accumulation time of the pixel of the second pixel group is the time (T6−T4) from the charge accumulation start time T4 of the second pixel group to the light reception end time T6.

Accordingly, in a case where the charge amount accumulated in the pixel of the first pixel group due to the reception of the reflected light from the subject of the processing target pulse light is Q1, and the charge amount accumulated in the pixel of the second pixel group is Q2, the time (T6−T5) is represented by the following equation (16).

$$(T6-T5)=(T5-T2)\times(Q2-Q2min)/Q1 \quad (16)$$

Here, Q2min is represented by the following equation (17) regardless of the distance D [m] between the imaging device 13 and the subject.

$$Q2min=Q1\times(T5-T4)/(T5-T2) \quad (17)$$

Accordingly, the distance detection part 16 can obtain the time (T6−T5) on the basis of the light projection start time T2, the light projection end time T5, the charge accumulation start time T4 of the second pixel, the charge amount Q1, and the charge amount Q2.

The distance detection part 16 obtains the distance D [m] by the equation (3) using the time (T6−T5) obtained as described above.

As a result, as shown in FIG. 17, in a case where the charge amount Q1 is the charge amount Q1_9 and the charge amount Q2 is the charge amount Q2_9, the distance D [m] obtained by the distance detection part 16 is represented by the following equation (18).

$$D[m]=0.5\times c\times(T5-T2)\times(Q2\_9-Q2min)/Q1\_9 \quad (18)$$

In the case of FIG. 17, since the imaging device 13 is apart from the subject in the pixel of the first pixel group, the projection end time T5 of the processing target pulse light and the light reception end time T6 are different. Accordingly, the charge amount Q2_9 is not the same as Q2min. Therefore, the distance D [m] obtained by the equation (18) is not 0.

On the other hand, as shown in FIG. 18, in a case where the charge amount Q1 is the charge amount Q1_10 and the charge amount Q2 is the charge amount Q2_10, the distance D [m] obtained by the distance detection part 16 is represented by the following equation (19).

$$D[m]=0.5\times c\times(T5-T2)\times(Q2\_10-Q2min)/Q1\_10 \quad (19)$$

In the case of FIG. 18, since the imaging device 13 is not apart from the subject in the pixel of the first pixel group, the projection end time T5 of the processing target pulse light and the light reception end time T6 are the same. Accordingly, the charge amount Q2_10 is the same as Q2min. Therefore, the distance D [m] obtained by the equation (15) is 0.

(Explanation of Sixth Example of Pair Determination Processing)

Figure 19:
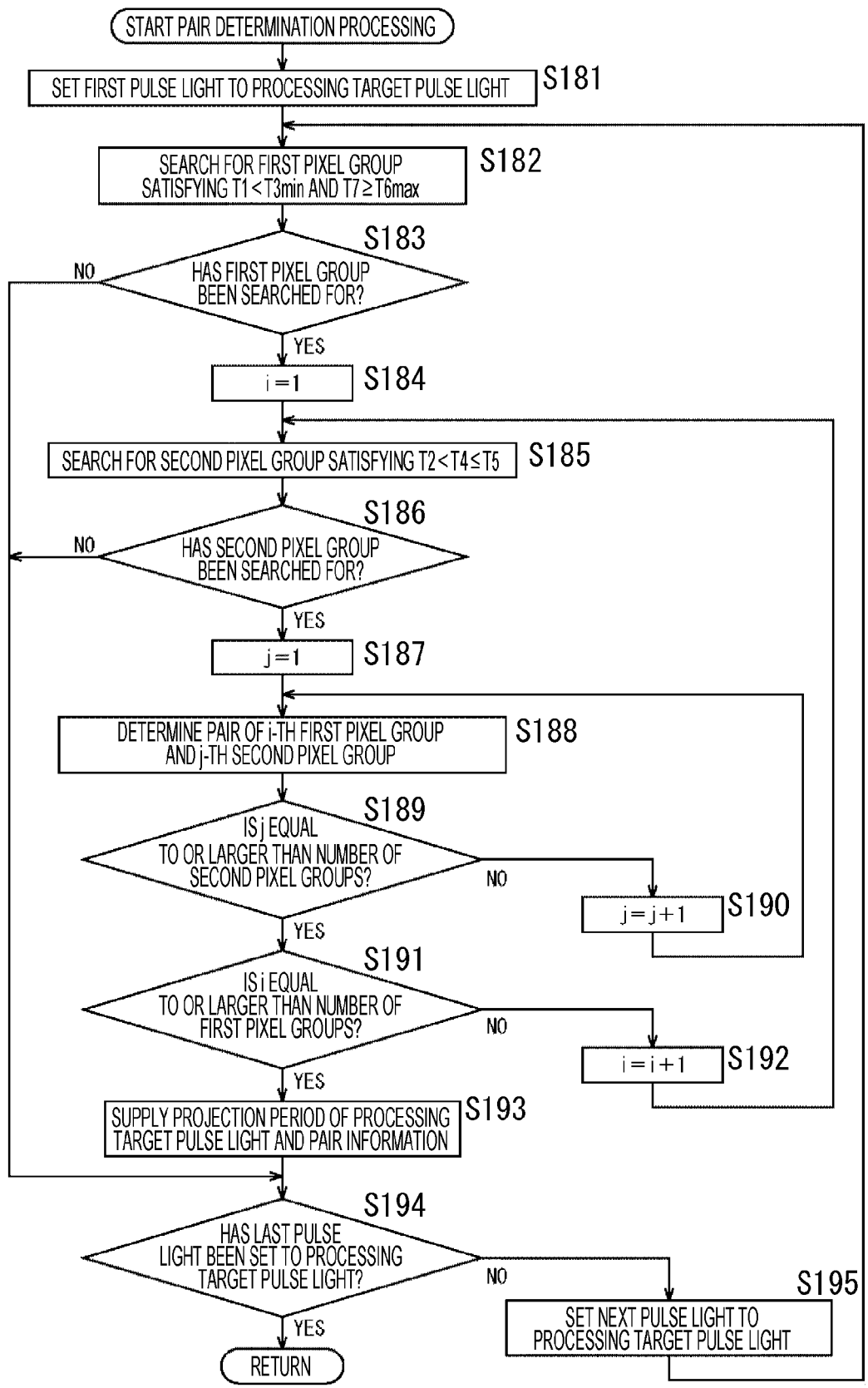
FIG. 19 is a flowchart explaining a sixth example of the pair determination processing.

FIG. 19 is a flowchart explaining a sixth example of pair determination processing in step S13 of FIG. 3.

In step S181 of FIG. 19, the determination part 15 sets the first pulse light of the processing target pulse light group to the processing target pulse light.

In step S182, the determination part 15 searches for the first pixel group in which the charge accumulation start time T1 supplied from the imaging control part 14 is earlier than the predetermined T3min, and the charge accumulation end time T7 is the same as the predetermined T6 max or later than the T6max.

The T3min is a predicted value of the light reception start time T3 in a case where the distance D [m] is a predetermined detectable distance lower limit value Lmin [m], and is represented by the following equation (20) using the detectable distance lower limit value Lmin [m] and the light projection start time T2 of the processing target pulse light.

$$T3min=T2+2\times Lmin/c \quad (20)$$

Furthermore, the T6max is a predicted value of the light reception end time T6 in a case where the distance D [m] is a predetermined detectable distance lower limit value Lmax [m], and is represented by the following equation (21) using the detectable distance upper limit value Lmax [m] and the light projection start time T2 of the processing target pulse light.

$$T6max=T5+2\times Lmax/c \quad (21)$$

In this case, the distance detection part 16 can detect the distance D [m] between the detectable distance lower limit value Lmin [m] and the detectable distance upper limit value Lmax [m].

The processes of steps S183 to S195 are similar to the processes of steps S153 to S165 of FIG. 16, and the description thereof will be omitted.

Note that the determination part 15 may use an estimated value T3est of the light reception start time T3 and an estimated value T6est of the light reception end time T6 instead of T3min and T6max. The estimated value T3est and the estimated value T6est are estimated, for example, from the tendency of the detection result of the past distance D [m].

In a case where the distance detection is performed by a method other than the method by the distance detection part 16 (the phase difference detection method, or the like), as in a case where the imaging device 13 includes pixels for distance detection of the imaging device not shown having a pixel for photographing, a pixel for distance detection, and a pixel for phase difference, the estimated value T3est and the estimated value T6est may be estimated from the distance detection result.

(Explanation of Seventh Example of Pair Determination Processing)

Figure 20:
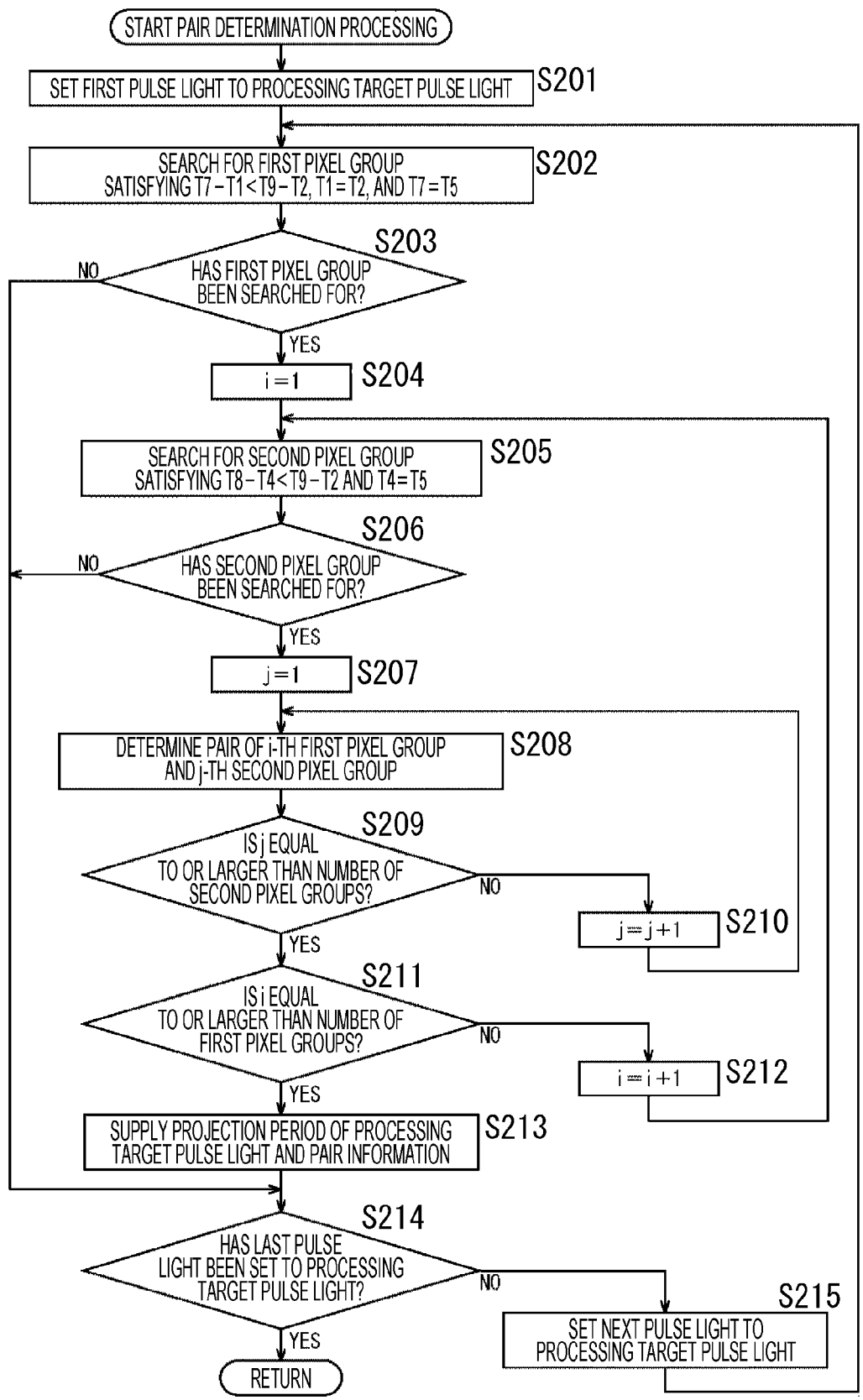
FIG. 20 is a flowchart for explaining a seventh example of the pair determination processing.

FIG. 20 is a flowchart explaining a seventh example of pair determination processing in step S13 of FIG. 3.

In step S201 of FIG. 20, the determination part 15 sets the first pulse light of the processing target pulse light group to the processing target pulse light.

In step S202, the determination part 15 searches for the first pixel group in which the charge accumulation time (T7−T1) is shorter than the time (T9−T2) from the light projection start time T2 of the processing target pulse light to the light projection start time T9 of the next pulse light, the charge accumulation start time T1 is the same as the light projection start time T2, and the charge accumulation end time T7 is the same as the light projection end time T5.

In other words, among the first pixel groups determined in the first example of the pair determination processing, the determination part 15 searches for, as the first pixel group, only groups in which the charge accumulation time is smaller than the light projection cycle (light projection interval time) of the pulse light.

The processes of steps S203 and S204 are similar to the processes of steps S33 and S34 of FIG. 4, and the description thereof will be omitted.

In step S205, the determination part 15 searches for the second pixel group in which the charge accumulation time (T8−T4) is smaller than the time (T9−T2), and the charge accumulation start time T4 is the same as the light projection end time T5.

In other words, among the second pixel groups determined in the first example of the pair determination processing, the determination part 15 searches for, as the second pixel group, only groups in which the charge accumulation time is smaller than the light projection cycle of the pulse light.

The processes of steps S206 to S215 are similar to the processes of steps S36 to S45 of FIG. 4, and the description thereof will be omitted.

As described above, in the seventh example of the pair determination processing, the first pixel group and the second pixel group are determined such that the charge accumulation time is smaller than the light projection cycle of the pulsed light. As a result, the number of pulse lights for which light projection is started while the pixels of the first pixel group and the second pixel group accumulate charges is less than 1, independent of the pulse light projection period and the charge accumulation period. Accordingly, it is possible to prevent a case in which the pixel signal used for detection of the distance D [m] is a pixel signal of charges by reflected light of a plurality of pulse lights. As a result, the detection accuracy of the distance D [m] can be improved.

Note that, although illustration is omitted, also in the second example to the sixth example of the pair determination processing, as similar to the first example, among the first pixel group and the second pixel group determined in the second example to the sixth example, only a group in which the charge accumulation time is smaller than the light projection cycle of the pulsed light may be determined as the first pixel group and the second pixel group.

As described above, the distance detection device 10 determines a pair of a first pixel group and a second pixel group used for detection of the distance between the imaging device 13 and the subject (target object), from a plurality of pixel groups, on the basis of the charge accumulation period of each pixel group, and the light projection period of the pulse light. Accordingly, the distance between the imaging device 13 and the subject (target object) can be detected by using the imaging device 13 with high versatility without using a special imaging device such as a CMOS imaging device having a charge distribution pixel structure or an imaging device capable of controlling the charge accumulation period of each pixel group on the basis of a projection period of the pulse light.

Second Embodiment (Configuration Example of Second Embodiment of Signal Processing Device)

Figure 21:
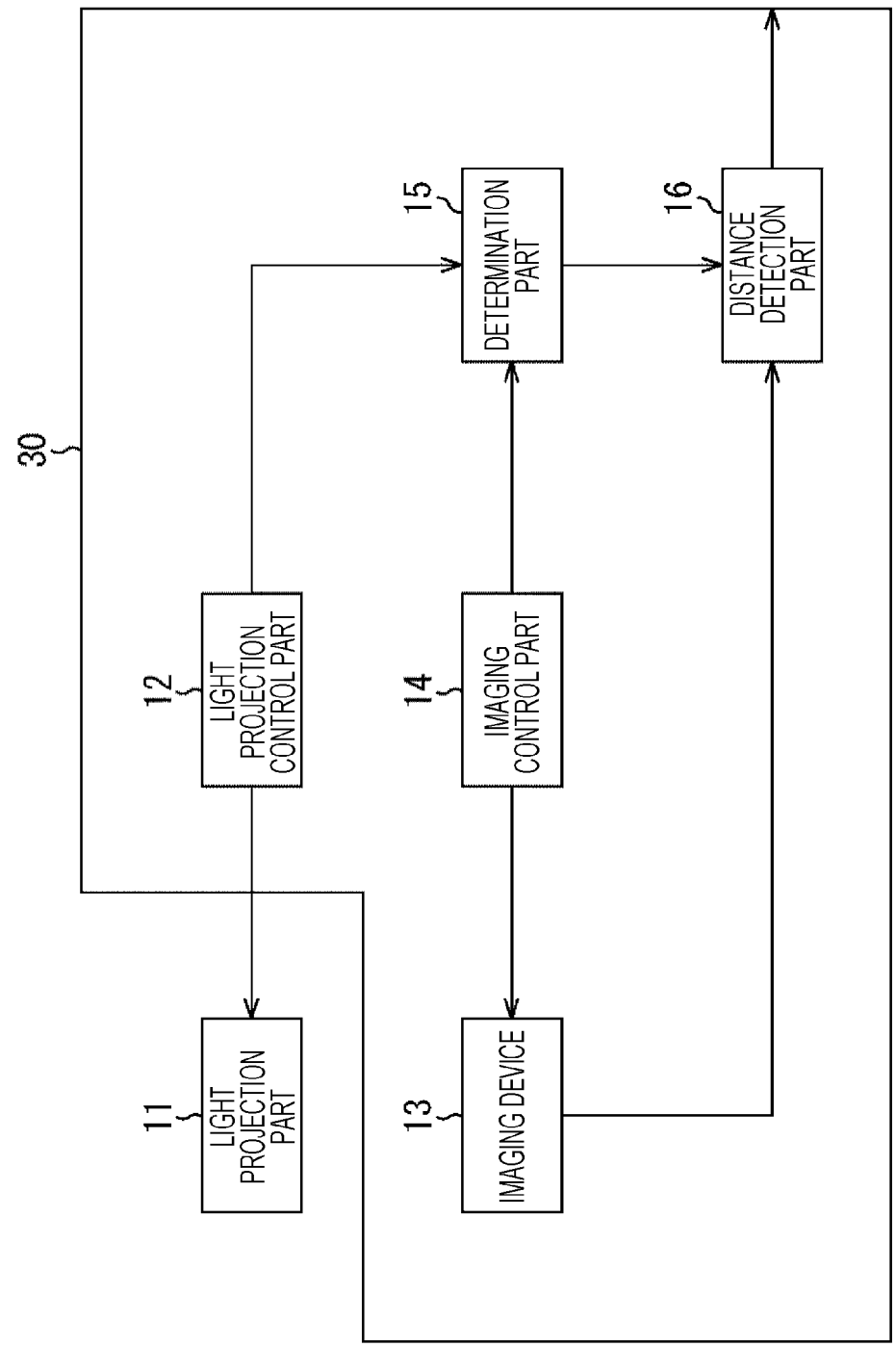
FIG. 21 is a block diagram showing a configuration example of a second embodiment of a distance detection device as a signal processing device to which the present disclosure is applied.

FIG. 21 is a block diagram showing a configuration example of a second embodiment of a distance detection device as a signal processing device to which the present disclosure is applied.

The same reference numerals are added to the same configurations as the configurations of FIG. 1, in the configurations shown in FIG. 21. Redundant explanations are omitted as appropriate.

The configuration of the distance detection device 30 of FIG. 21 is different from the configuration of the distance detection device 10 of FIG. 1 in that the light projection part 11 is provided outside the distance detection device 30. In other words, in the distance detection device 30, the light projection control part 12 of the distance detection device 30 controls the light projection part 11 provided outside the distance detection device 30.

Third Embodiment (Configuration Example of Third Embodiment of Signal Processing Device)

Figure 22:
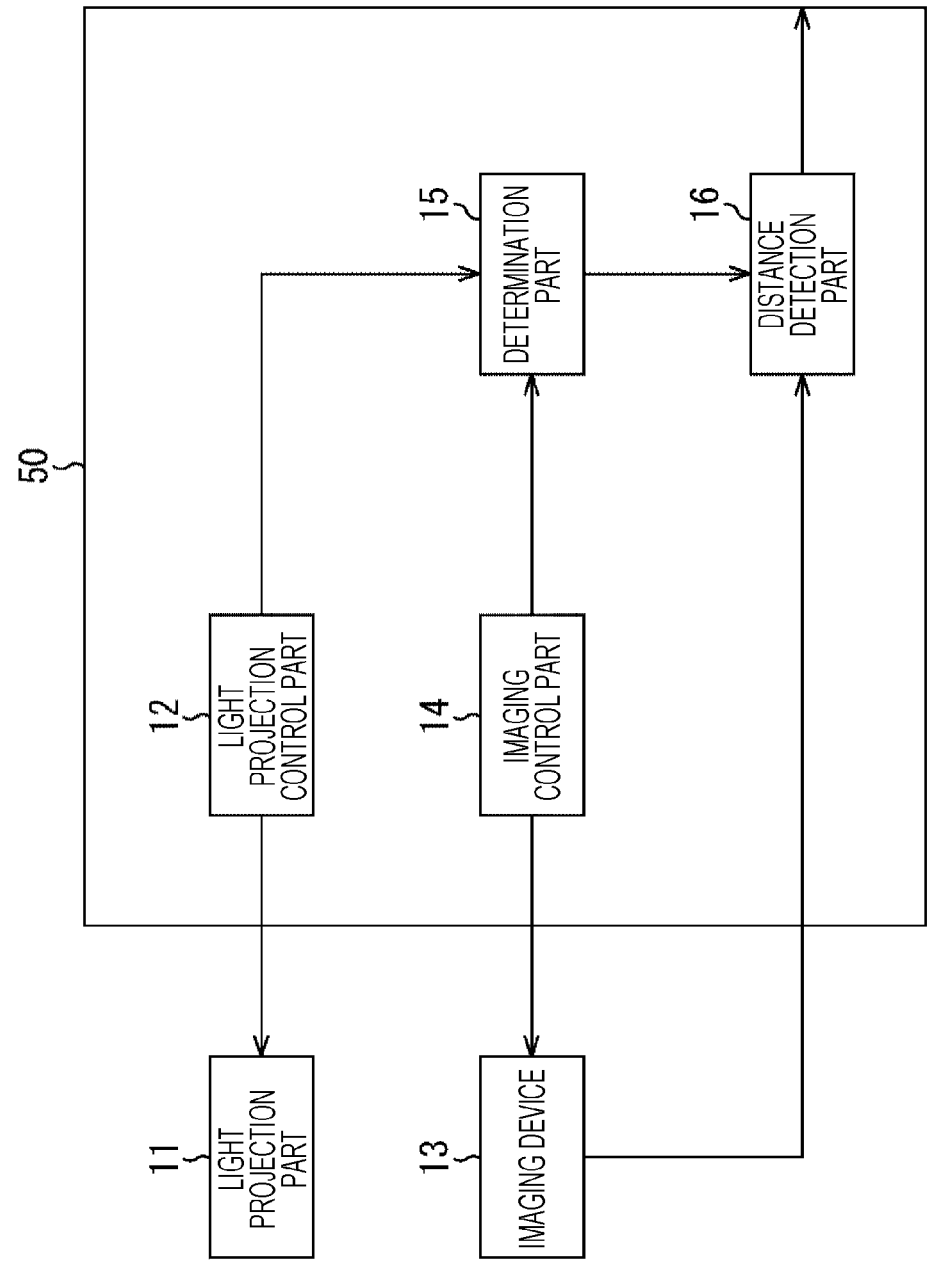
FIG. 22 is a block diagram showing a configuration example of a third embodiment of a distance detection device as a signal processing device to which the present disclosure is applied.

FIG. 22 is a block diagram showing a configuration example of a third embodiment of a distance detection device as a signal processing device to which the present disclosure is applied.

The same reference numerals are added to the same configurations as the configurations of FIG. 1, in the configurations shown in FIG. 22. Redundant explanations are omitted as appropriate.

The configuration of the distance detection device 50 of FIG. 22 is different from the configuration of the distance detection device 10 of FIG. 1 in that the light projection part 11 and the imaging device 13 are provided outside the distance detection device 50. In other words, in the distance detection device 50, the light projection control part 12 of the distance detection device 50 controls the light projection part 11 provided outside the distance detection device 50, and the imaging control part 14 of the distance detection device 50 controls the imaging device 13 provided outside the distance detection device 50.

Fourth Embodiment (Configuration Example of Fourth Embodiment of Signal Processing Device)

Figure 23:
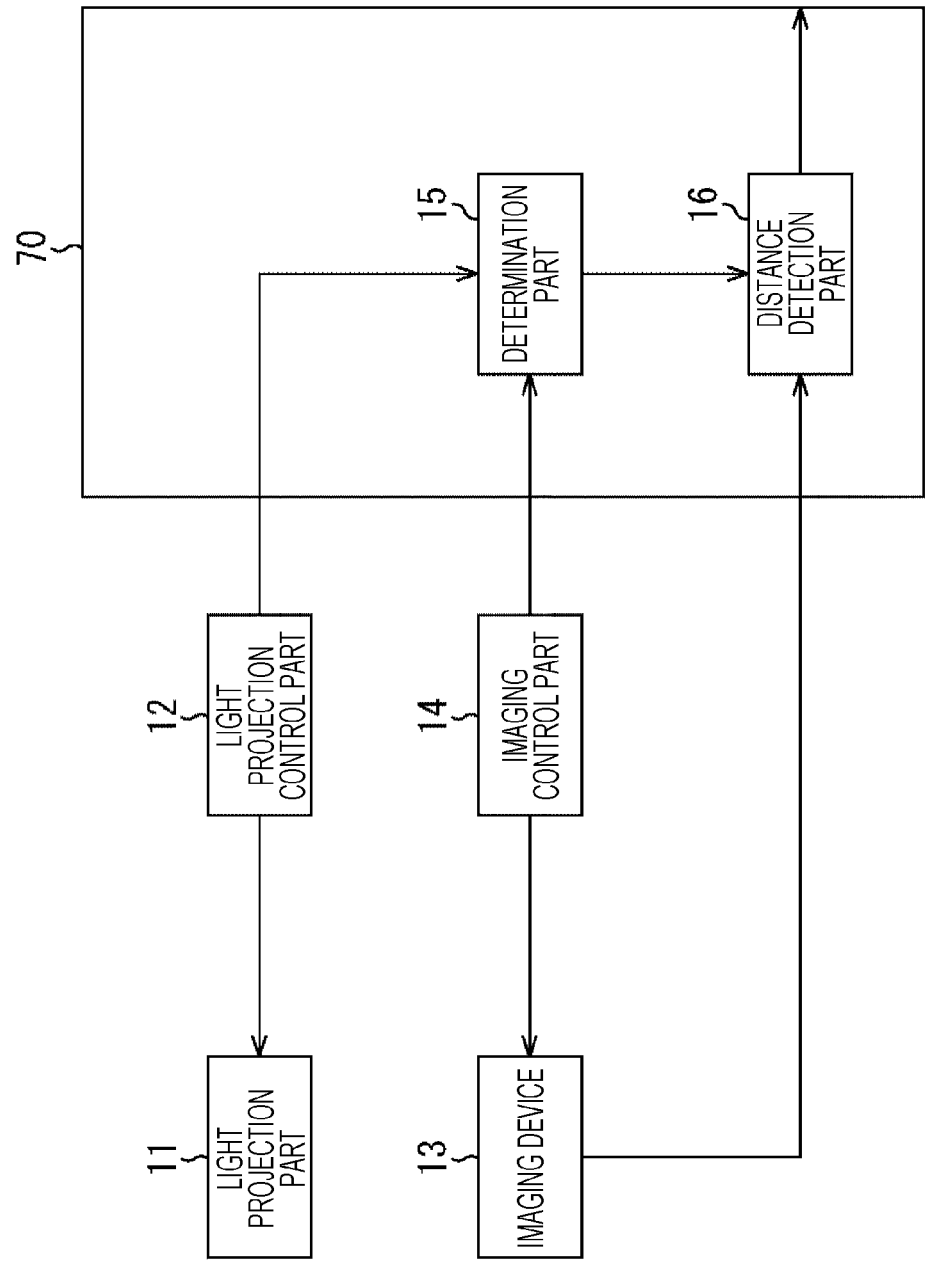
FIG. 23 is a block diagram showing a configuration example of a fourth embodiment of a distance detection device as a signal processing device to which the present disclosure is applied.

FIG. 23 is a block diagram showing a configuration example of a fourth embodiment of a distance detection device as a signal processing device to which the present disclosure is applied.

The same reference numerals are added to the same configurations as the configurations of FIG. 1, in the configurations shown in FIG. 23. Redundant explanations are omitted as appropriate.

The configuration of the distance detection device 70 of FIG. 23 is different from the configuration of the distance detection device 10 of FIG. 1 in that the light projection part 11, the light projection control part 12, the imaging device 13, and the imaging control part 14 are provided outside the distance detection device 70. In other words, in the distance detection device 70, the determination part 15 acquires the light projection period from the light projection control part 12 provided outside the distance detection device 70, and acquires the charge accumulation period from the imaging control part 14.

Fifth Embodiment (Configuration Example of Fifth Embodiment of Signal Processing Device)

Figure 24:
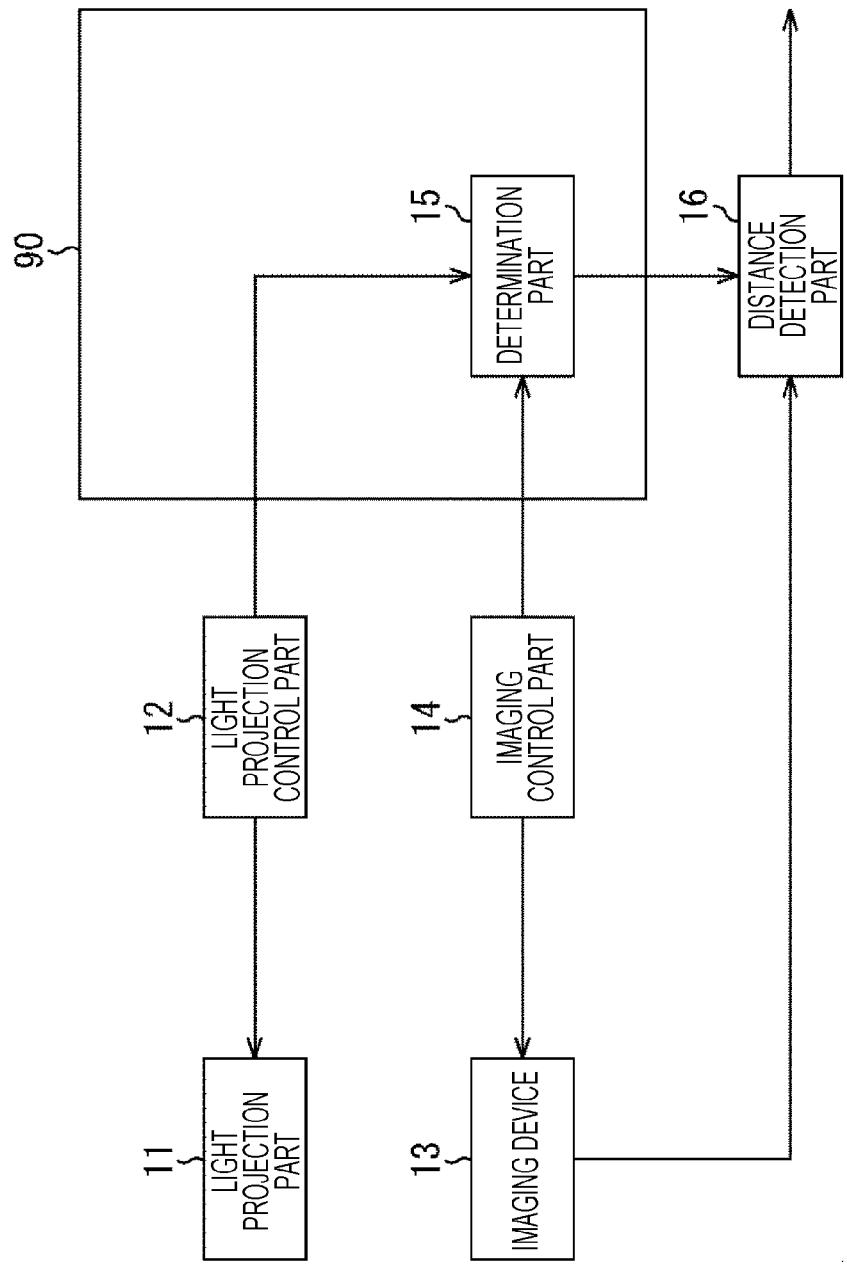
FIG. 24 is a block diagram showing a configuration example of a fifth embodiment of a distance detection device as a signal processing device to which the present disclosure is applied.

FIG. 24 is a block diagram showing a configuration example of a fifth embodiment of a distance detection device as a signal processing device to which the present disclosure is applied.

The same reference numerals are added to the same configurations as the configurations of FIG. 1, in the configurations shown in FIG. 24. Redundant explanations are omitted as appropriate.

The configuration of the distance detection device 90 of FIG. 24 is different from the configuration of the distance detection device 10 of FIG. 1 in that the light projection part 11, the light projection control part 12, the imaging device 13, the imaging control part 14, and the distance detection part 16 are provided outside the distance detection device 90. In other words, in the distance detection device 90, the determination part 15 acquires the light projection period from the light projection control part 12 provided outside the distance detection device 90, acquires the charge accumulation period from the imaging control part 14, and performs the pair determination processing. Then, the determination part 15 associates the light projection period of each pulse light with the pair information corresponding to the pulse light, and supplies the result to the distance detection part 16 provided outside the distance detection device 90.

Sixth Embodiment (Configuration Example of Sixth Embodiment of Signal Processing Device)

Figure 25:
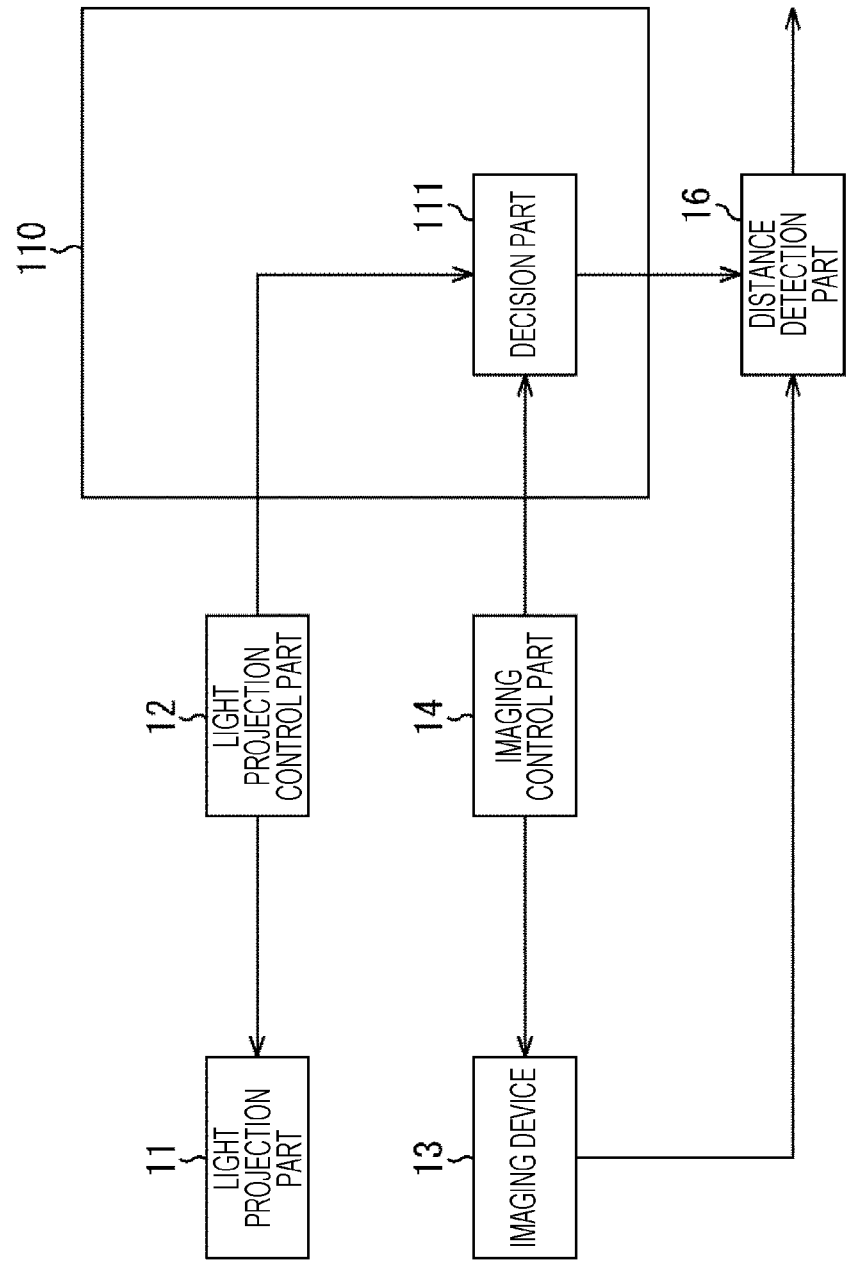
FIG. 25 is a block diagram showing a configuration example of a sixth embodiment of a distance detection device as a signal processing device to which the present disclosure is applied.

FIG. 25 is a block diagram showing a configuration example of a sixth embodiment of a distance detection device as a signal processing device to which the present disclosure is applied.

The same reference numerals are added to the same configurations as the configurations of FIG. 24, in the configurations shown in FIG. 25. Redundant explanations are omitted as appropriate.

The distance detection device 110 in FIG. 25 is different from the configuration of the distance detection device 90 in FIG. 24 in that the decision part 111 is provided instead of the determination part 15. The distance detection device 110 does not determine the pair of the first pixel group and the second pixel group for each pulse light, but determines whether one or more pairs of two pixel groups determined in advance are pairs of the first pixel group and the second pixel group.

Specifically, the decision part 111 of the distance detection device 110 decides, for each pulse light, whether the pair is a pair of first pixel group and the second pixel group on the basis of the light projection period and the charge accumulation period of each pair of two pixel groups determined in advance. The decision part 111 associates the light projection period of each pulse light with the pair information indicating the charge accumulation period of the pairs decided to be the pairs of the first pixel group and the second pixel group corresponding to the pulse light, and supplies the result to the distance detection part 16. Note that the decision part 111 may associate the light projection period of each pulse light with the pair information corresponding to the pulse light, and temporarily hold the result.

(Explanation of Distance Detection Processing)

Figure 26:
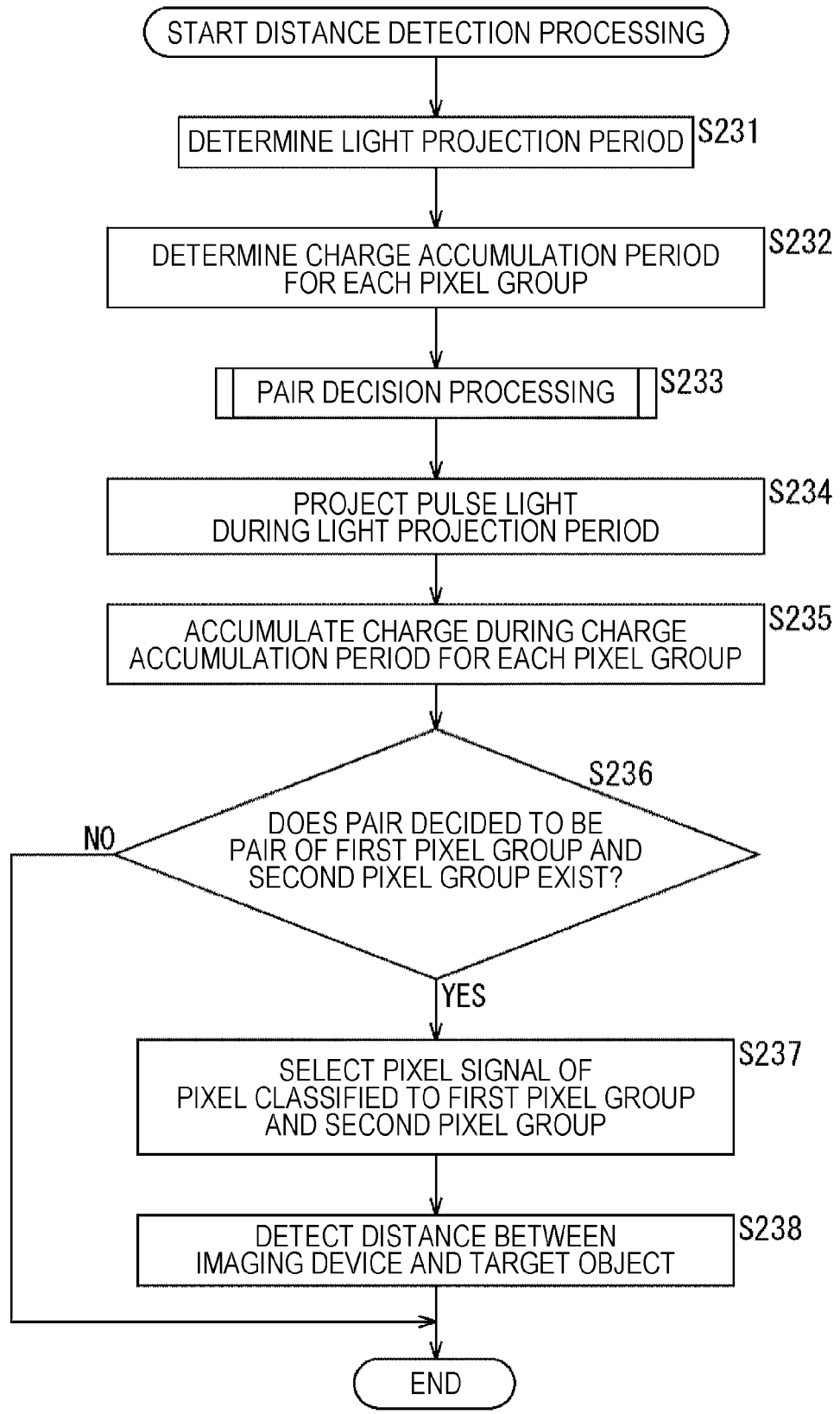
FIG. 26 is a flowchart explaining distance detection processing of the distance detection device of FIG. 25.

FIG. 26 is a flowchart explaining distance detection processing of the distance detection device 110 of FIG. 25. This distance detection processing is performed, for example, for each pulse light group that is one or more pieces of pulse light projected within a predetermined unit time.

The processes of steps S231 and S232 of FIG. 26 are similar to the processes of steps S11 and S12 of FIG. 3, and the description thereof will be omitted.

In step S233, the decision part 111 performs pair decision processing of deciding, for each pulse light, whether the pair is a pair of first pixel group and the second pixel group on the basis of the light projection period and the charge accumulation period of each pair of two pixel groups determined in advance. The details of the pair decision processing will be described with reference to FIG. 27 as described later.

The processes of steps S234 and S235 are similar to the processes of steps S14 and S15 of FIG. 3, and the description thereof will be omitted.

In step S236, the decision part 111 decides, for each pulsed light, whether there is a pair of two pixel groups decided to be a pair of the first pixel group and the second pixel group by the process of step S233. In a case where it is decided in step S236 that there is a pair of two pixel groups decided to be a pair of the first pixel group and the second pixel group, the process proceeds to step S237.

The processes of steps S237 and S238 are similar to the processes of steps S16 and S17 of FIG. 3, and the description thereof will be omitted.

On the other hand, in a case where it is decided in step S236 that there is no pair of two pixel groups decided to be a pair of the first pixel group and the second pixel group, the processes in steps S237 and S238 are skipped, and the process ends.

Figure 27:
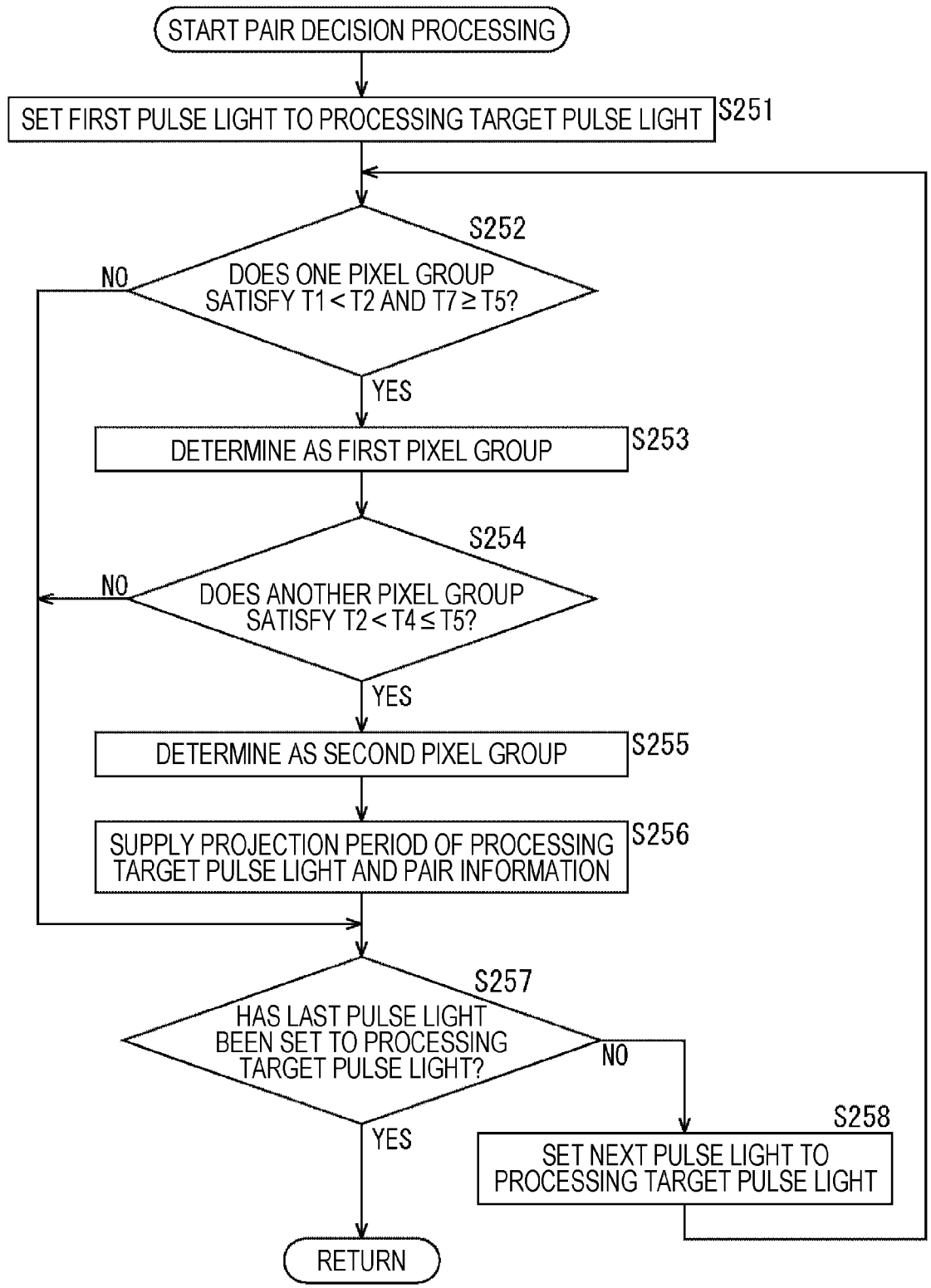
FIG. 27 is a flowchart explaining pair decision processing of FIG. 26.

FIG. 27 is a flowchart illustrating the pair decision processing of step S233 of FIG. 26. The pair decision processing is performed, for example, for each pair of two predetermined pixel groups.

In step S251 of FIG. 27, the decision part 111 sets the first pulse light of the processing target pulse light group to the processing target pulse light.

In step S252, it is decided whether the charge accumulation start time T1 is earlier than the light projection start time T2 and the charge accumulation end time T7 is the same as or later than the light projection end time T5 in one pixel group of the processing target pair of two pixel groups determined in advance.

In step S252, in a case where, in one pixel group, it is decided that the charge accumulation start time T1 is earlier than the light projection start time T2, and the charge accumulation end time T7 is the same as or later than the light projection end time T5, the process proceeds to step S253.

In step S253, the decision part 111 determines one pixel group in the processing target pair of two pixel groups determined in advance as the first pixel group.

In step S254, it is decided whether the charge accumulation start time T4 is later than the light projection start time T2 and is the same as or earlier than the light projection end time T5 in another pixel group of the pair of processing target two pixel groups determined in advance.

In step S254, in a case where, in another pixel group, it is decided that the charge accumulation start time T4 is later than the light projection start time T2, and is the same as or earlier than the light projection end time T5, the process proceeds to step S255.

In step S255, the decision part 111 determines another pixel group in the processing target pair of two pixel groups determined in advance as the second pixel group.

In step S256, the decision part 111 supplies the projection period of the processing target pulse light and the pair information of the processing target pair of two pixel groups determined in advance to the distance detection part 16, and the process proceeds to step S257.

On the other hand, in step S252, in a case where, in one pixel group, it is decided that the charge accumulation start time T1 is not earlier than the light projection start time T2, or the charge accumulation end time T7 is not the same as the light projection end time T5 or not later than the light projection end time T5, the process proceeds to step S257.

Furthermore, in step S254, in a case where, in another pixel group, it is decided that the charge accumulation start time T4 is not later than the light projection start time T2, or is not the same as the light projection end time T5 or not earlier than the light projection end time T5, the process proceeds to step S257.

The processes of steps S257 and S258 are similar to the processes of steps S164 and S165 of FIG. 16, and the description thereof will be omitted.

Note that the conditions of the pair of the first pixel group and the second pixel group in the pair decision process may be the same as the conditions in the pair determination process of FIG. 4, FIG. 7, FIG. 10, FIG. 13, FIG. 19, or FIG. 20.

As described above, the decision part 111 of the distance detection device 110 decides whether the pair is a pair of first pixel group and the second pixel group on the basis of the charge accumulation period of the pair of two pixel groups determined in advance, and the projection period of the pulse light. In other words, the decision part 111 (distance possibility judgement part) decides whether operation of distance from the imaging device 13 to the subject using the pair is possible on the basis of the charge accumulation period of the pair of two pixel groups determined in advance, and the projection period of the pulse light.

Accordingly, the distance between the imaging device 13 and the subject can be detected using the pair of which operation of distance from the imaging device 13 to the subject is decided to be possible. As a result, the distance between the imaging device 13 and the subject can be detected by using the imaging device 13 with high versatility without using a special imaging device such as a CMOS imaging device having a charge distribution pixel structure or an imaging device capable of controlling the charge accumulation period of each pixel group on the basis of a projection period of the pulse light.

Note that in the sixth embodiment of the distance detection device, the decision part 111 may be provided instead of the determination part 15 in the first to fourth embodiments.

Seventh Embodiment (Explanation of Computer to which the Present Disclosure is Applied)

The series of processing described above can be also executed by hardware or can be executed by software. In a case where a series of processing is executed by software, a program constituting the software is installed in a computer. Here, the computer includes a computer incorporated in dedicated hardware and a general-purpose personal computer capable of executing various functions by installing various programs, for example, and the like.

Figure 28:
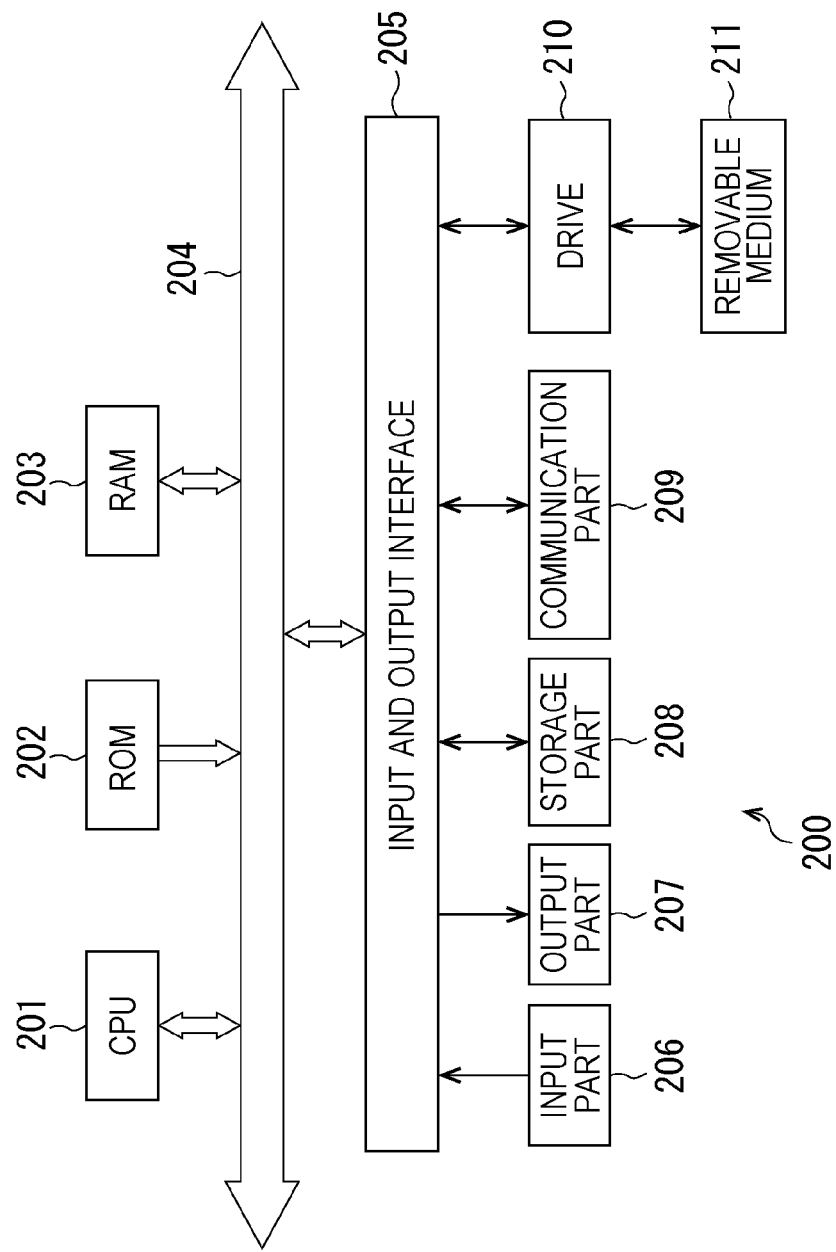
FIG. 28 is a block diagram showing a configuration example of hardware of a computer.

FIG. 28 is a block diagram showing an example of a hardware configuration of a computer that executes the above-described series of processing by a program.

In a computer 200, a central processing unit (CPU) 201, a read only memory (ROM) 202, and a random access memory (RAM) 203 are mutually connected by a bus 204.

An input and output interface 205 is further connected to the bus 204. An input part 206, an output part 207, a storage part 208, a communication part 209, and a drive 210 are connected to the input and output interface 205.

The input part 206 includes a keyboard, a mouse, a microphone, and the like. The output part 207 includes a display, a speaker, and the like. The storage part 208 includes a hard disk, a nonvolatile memory, and the like. The communication part 209 includes a network interface and the like. The drive 210 drives a removable medium 211 such as a magnetic disk, an optical disk, a magneto-optical disk, or a semiconductor memory.

In the computer 200 configured as described above, for example, the CPU 201 loads the program stored in the storage part 208 into the RAM 203 via the input and output interface 205 and the bus 204, and executes the program, so that the above-described series of processing is performed.

The program executed by the computer 200 (CPU 201) can be provided by being recorded on the removable medium 211 as a package medium or the like, for example. Furthermore, the program can be provided via a wired or wireless transmission medium such as a local area network, the Internet, or digital satellite broadcasting.

In the computer 200, a program can be installed in the storage part 208 via the input and output interface 205 by mounting the removable medium 211 to the drive 210. Furthermore, the program can be received by the communication part 209 via a wired or wireless transmission medium and installed in the storage part 208. In addition, the program can be installed in the ROM 202 or the storage part 208 in advance.

Note that the program executed by the computer 200 may be a program of processing in chronological order according to the order described in the present specification or may be a program of processing in parallel or at necessary timing such as when a call is made.

Application Example

The technology according to the present disclosure can be applied to various products. For example, the technology according to the present disclosure may be realized as a device mounted on any type of mobile body such as automobile, electric vehicle, hybrid electric vehicle, motorcycle, bicycle, personal mobility, airplane, drone, ship, robot, construction machine, or agricultural machine (tractor).

FIG. 29 is a block diagram showing a schematic configuration example of a vehicle control system 7000 which is an example of a mobile body control system to which the technology according to the present disclosure can be applied. The vehicle control system 7000 includes a plurality of electronic control units connected via a communication network 7010. In the example shown in FIG. 29, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010 connecting the plurality of control units may be, for example, an in-vehicle communication network conforming to an arbitrary standard such as the controller area network (CAN), the local interconnect network (LIN), the local area network (LAN), or the FlexRay (registered trademark).

Each control unit includes a microcomputer that performs operation processing according to various programs, a storage part that stores programs executed by the microcomputer, parameters used for various operations, or the like, and a drive circuit that drives devices subjected to various control. Each control unit includes a network I/F for communicating with another control unit via the communication network 7010, and includes a communication I/F for communication by wired communication or wireless communication with vehicle interior or exterior device, a sensor, or the like. FIG. 29 shows, as functional configuration of the integrated control unit 7600, a microcomputer 7610, a general-purpose communication I/F 7620, a dedicated communication I/F 7630, a positioning part 7640, a beacon reception part 7650, vehicle interior equipment I/F 7660, an audio image output part 7670, an in-vehicle network I/F 7680, and a storage part 7690. Similarly, each of the other control units includes a microcomputer, a communication I/F, a storage part, and the like.

The drive system control unit 7100 controls the operation of the device related to the drive system of the vehicle according to various programs. For example, the drive system control unit 7100 functions as a control device of a driving force generation device for generating a drive force of a vehicle such as an internal combustion engine or a driving motor, a drive force transmission mechanism for transmitting a drive force to wheels, a steering mechanism that adjusts a wheeling angle of the vehicle, a braking device that generates a braking force of the vehicle, and the like. The drive system control unit 7100 may have a function as a control device such as antilock brake system (ABS), or an electronic stability control (ESC).

A vehicle state detection part 7110 is connected to the drive system control unit 7100. The vehicle state detection part 7110 includes, for example, at least one of a gyro sensor that detects the angular velocity of the axis rotational motion of the vehicle body, an acceleration sensor that detects the acceleration of the vehicle, or a sensor for detecting an operation amount of an accelerator pedal, an operation amount of a brake pedal, steering of a steering wheel, an engine rotation speed, a wheel rotation speed, or the like. The drive system control unit 7100 performs operation processing using the signal input from the vehicle state detection part 7110 and controls the internal combustion engine, the driving motor, the electric power steering device, the brake device, or the like.

The body system control unit 7200 controls the operation of various devices mounted on the vehicle according to various programs. For example, the body system control unit 7200 functions as a keyless entry system, a smart key system, a power window device, or a control device for various lamps such as a head lamp, a back lamp, a brake lamp, a turn indicator, or a fog lamp. In this case, radio waves transmitted from a portable device that substitutes keys or signals of various switches may be input to the body system control unit 7200. The body system control unit 7200 receives input of these radio waves or signals and controls a door lock device, a power window device, a lamp, or the like of the vehicle.

The battery control unit 7300 controls a secondary battery 7310 that is a power supply source of the driving motor according to various programs. For example, information such as battery temperature, a battery output voltage, or remaining capacity of the battery is input to the battery control unit 7300 from the battery device including the secondary battery 7310. The battery control unit 7300 performs arithmetic processing using these signals and controls the temperature adjustment of the secondary battery 7310, or the cooling device or the like included in the battery device.

The vehicle exterior information detection unit 7400 detects information outside the vehicle equipped with the vehicle control system 7000. For example, at least one of the imaging part 7410 or the vehicle exterior information detection part 7420 is connected to the vehicle exterior information detection unit 7400. The imaging part 7410 includes at least one of a time of flight (ToF) camera, a stereo camera, a monocular camera, an infrared camera, or other cameras. The vehicle exterior information detection part 7420 includes, for example, at least one of an environmental sensor for detecting the current weather or climate, or an ambient information detection sensor for detecting another vehicle, an obstacle, a pedestrian, or the like around the vehicle equipped with the vehicle control system 7000.

The environmental sensor may be, for example, at least one of a raindrop sensor that detects rain, a fog sensor that detects mist, a sunshine sensor that detects sunshine degree, or a snow sensor that detects snowfall. The ambient information detection sensor may be at least one of an ultrasonic sensor, a radar device, or a light detection and ranging, laser imaging detection and ranging (LIDAR) device. The imaging part 7410 and the vehicle exterior information detection part 7420 may be provided as independent sensors or devices, respectively, or may be provided as a device in which a plurality of sensors or devices are integrated.

Here, FIG. 30 shows an example of installation positions of the imaging part 7410 and the vehicle exterior information detection part 7420. The imaging parts 7910, 7912, 7914, 7916, and 7918 are provided at, for example, at least one of a front nose, a side mirror, a rear bumper, or a back door, of the vehicle 7900 or an upper portion of a windshield in the vehicle compartment. The imaging part 7910 provided for the front nose and the imaging part 7918 provided in the upper portion of the windshield in the vehicle compartment mainly acquire an image ahead of the vehicle 7900. The imaging parts 7912 and 7914 provided in the side mirror mainly acquire an image of the side of the vehicle 7900. The imaging part 7916 provided in the rear bumper or the back door mainly acquires an image behind the vehicle 7900. The imaging part 7918 provided on the upper portion of the windshield in the vehicle compartment is mainly used for detecting a preceding vehicle, a pedestrian, an obstacle, a traffic signal, a traffic sign, a lane, or the like.

Note that FIG. 30 shows an example of the imaging ranges of the imaging parts 7910, 7912, 7914, and 7916. An imaging range a indicates the imaging range of the imaging part 7910 provided in the front nose, the imaging ranges b and c indicate the imaging ranges of the imaging parts 7912 and 7914, respectively, provided in the side mirror, and the imaging range d indicates the imaging range of the imaging part 7916 provided in the rear bumper or the back door. For example, by superimposing the image data imaged by the imaging parts 7910, 7912, 7914, and 7916, an overhead view image of the vehicle 7900 viewed from above is obtained.

The vehicle exterior information detection parts 7920, 7922, 7924, 7926, 7928, and 7930 provided on the front, rear, side, or corner of the vehicle 7900 and the windshield in the upper portion of the vehicle compartment may be ultrasonic sensors or radar devices, for example. The vehicle exterior information detection parts 7920, 7926, and 7930 provided at the front nose, the rear bumper, or the back door of the vehicle 7900, and the upper portion of the windshield of the vehicle compartment may be the LIDAR device, for example. These vehicle exterior information detection parts 7920 to 7930 are mainly used for detecting a preceding vehicle, a pedestrian, an obstacle, or the like.

Returning to FIG. 29, the description will be continued. The vehicle exterior information detection unit 7400 causes the imaging part 7410 to image an image of the exterior of the vehicle and receives the imaged image data. Furthermore, the vehicle exterior information detection unit 7400 receives the detection information from the connected vehicle exterior information detection part 7420. In a case where the vehicle exterior information detection part 7420 is an ultrasonic sensor, a radar device, or a LIDAR device, the exterior information detection unit 7400 transmits ultrasonic waves, electromagnetic waves, or the like, and receives information of the received reflected waves. The vehicle exterior information detection unit 7400 may perform object detection processing or distance detection processing of a person, a car, an obstacle, a sign, a character on a road surface, or the like, on the basis of the received information. The vehicle exterior information detection unit 7400 may perform environment recognition processing for recognizing rainfall, fog, road surface condition, or the like on the basis of the received information. The vehicle exterior information detection unit 7400 may calculate the distance to the object outside the vehicle on the basis of the received information.

Furthermore, the vehicle exterior information detection unit 7400 may perform image recognition processing of recognizing a person, a car, an obstacle, a sign, a character on a road surface, or the like, on the basis of the received image data, or distance detection processing. The vehicle exterior information detection unit 7400 performs processing such as distortion correction or positioning on the received image data and combines the image data imaged by different imaging parts 7410 to generate an overhead view image or a panorama image. The vehicle exterior information detection unit 7400 may perform viewpoint conversion processing using image data imaged by different imaging parts 7410.

The vehicle interior information detection unit 7500 detects vehicle interior information. For example, a driver state detection part 7510 that detects the state of the driver is connected to the vehicle interior information detection unit 7500. The driver state detection part 7510 may include a camera for imaging the driver, a biometric sensor for detecting the biological information of the driver, a microphone for collecting sound in the vehicle compartment, and the like. The biometric sensor is provided on, for example, a seating surface, a steering wheel or the like, and detects biometric information of an occupant sitting on a seat or a driver holding a steering wheel. The vehicle interior information detection unit 7500 may calculate the degree of fatigue or the degree of concentration of the driver on the basis of the detection information input from the driver state detection part 7510, and may determine whether or not the driver is sleeping. The vehicle interior information detection unit 7500 may perform processing such as noise canceling processing on the collected sound signal.

The integrated control unit 7600 controls the overall operation of the vehicle control system 7000 according to various programs. An input part 7800 is connected to the integrated control unit 7600. The input part 7800 is realized by a device such as a touch panel, a button, a microphone, a switch, or a lever that can be input operated by an occupant, for example. Data obtained by performing speech recognition on the sound input by the microphone may be input to the integrated control unit 7600. The input part 7800 may be, for example, a remote control device using infrared rays or other radio waves, or an external connection device such as a mobile phone or a personal digital assistant (PDA) corresponding to the operation of the vehicle control system 7000. The input part 7800 may be, for example, a camera, in which case the occupant can input information by gesture. Alternatively, data obtained by detecting the movement of the wearable device worn by the occupant may be input. Moreover, the input part 7800 may include, for example, an input control circuit or the like that generates an input signal on the basis of information input by an occupant or the like using the input part 7800 and outputs the input signal to the integrated control unit 7600. By operating the input part 7800, an occupant or the like inputs various data or gives an instruction on processing operation to the vehicle control system 7000.

The storage part 7690 may include a read only memory (ROM) that stores various programs to be executed by the microcomputer, and a random access memory (RAM) that stores various parameters, operation results, sensor values, or the like. Furthermore, the storage part 7690 may be realized by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. A cellular communication protocol such as global system of mobile communications (GSM), WiMAX, long term evolution (LTE), or LTE-advanced (LTE-A), or other wireless communication protocols such as a wireless LAN (Wi-Fi (registered trademark)), or Bluetooth (registered trademark), may be implemented in the general-purpose communication I/F 7620. The general-purpose communication I/F 7620 may be connected to a device (for example, an application server or a control server) existing on an external network (for example, the Internet, a cloud network, or a company specific network) via a base station or an access point, for example. Furthermore, the general-purpose communication I/F 7620 uses, for example, the peer to peer (P2P) technology to perform connection with a terminal existing in the vicinity of the vehicle (for example, a terminal of a driver, a pedestrian, or a shop, or the machine type communication terminal (MTC).

The dedicated communication I/F 7630 is a communication I/F supporting a communication protocol formulated for use in a vehicle. For example, in the dedicated communication I/F 7630, a standard protocol such as the wireless access in vehicle environment (WAVE) that is combination of lower layer IEEE 802.11p and upper layer IEEE 1609, the dedicated short range communications (DSRC), or the cellular communication protocol may be implemented. Typically, the dedicated communication I/F 7630 performs V2X communication that is concept including one or more of a vehicle to vehicle communication, a vehicle to infrastructure communication, a vehicle to home communication, and a vehicle to pedestrian communication.

The positioning part 7640 receives a global navigation satellite system (GNSS) signal from a GNSS satellite (for example, a GPS signal from a global positioning system (GPS) satellite) and performs positioning, to generate position information including the latitude, longitude, and altitude of the vehicle. Note that the positioning part 7640 may specify the current position by exchanging signals with the wireless access point or may acquire the position information from a terminal such as a mobile phone, a PHS, or a smartphone having a positioning function.

The beacon reception part 7650 receives, for example, radio waves or electromagnetic waves transmitted from a radio station or the like installed on the road, and acquires information such as the current position, congestion, road closure, or required time. Note that the function of the beacon reception part 7650 may be included in the dedicated communication I/F 7630 described above.

The vehicle interior equipment I/F 7660 is a communication interface that mediates connection between the microcomputer 7610 and various interior equipment 7760 existing in the vehicle. The vehicle interior equipment I/F 7660 may establish a wireless connection using a wireless communication protocol such as wireless LAN, Bluetooth (registered trademark), near field communication (NFC), or a wireless USB (WUSB). Furthermore, the vehicle interior equipment I/F 7660 may establish wired connection such as a universal serial bus (USB), a high-definition multimedia interface (HDMI), or a mobile high-definition link (MHL) via a connection terminal not shown (and a cable if necessary). The vehicle interior equipment 7760 may include, for example, at least one of a mobile device or a wearable device possessed by an occupant, or an information device carried in or attached to the vehicle. Furthermore, the vehicle interior equipment 7760 may include a navigation device that performs a route search to an arbitrary destination. The vehicle interior equipment I/F 7660 exchanges control signals or data signals with these vehicle interior equipment 7760.

The in-vehicle network I/F 7680 is an interface mediating communication between the microcomputer 7610 and the communication network 7010. The in-vehicle network I/F 7680 transmits and receives signals and the like according to a predetermined protocol supported by the communication network 7010.

The microcomputer 7610 of the integrated control unit 7600 controls the vehicle control system 7000 in accordance with various programs on the basis of information acquired via at least one of the general-purpose communication I/F 7620, the dedicated communication I/F 7630, the positioning part 7640, the beacon reception part 7650, the vehicle interior equipment I/F 7660, or the in-vehicle network I/F 7680. For example, the microcomputer 7610 may operate a control target value of the drive force generation device, the steering mechanism, or the braking device on the basis of acquired information inside and outside the vehicle, and output a control command to the drive system control unit 7100. For example, the microcomputer 7610 may perform cooperative control for the purpose of function realization of an advanced driver assistance system (ADAS) including collision avoidance or impact mitigation of the vehicle, follow-up running based on inter-vehicle distance, vehicle speed maintenance running, vehicle collision warning, vehicle lane departure warning, or the like. Furthermore, the microcomputer 7610 may perform cooperative control for the purpose of automatic driving or the like by which a vehicle autonomously runs without depending on the operation of the driver by controlling the drive force generation device, the steering mechanism, the braking device, or the like on the basis of the acquired information on the surroundings of the vehicle.

The microcomputer 7610 may generate three-dimensional distance information between the vehicle and a surrounding structure, an object, a person, or the like on the basis of the information acquired via at least one of the general-purpose communication I/F 7620, the dedicated communication I/F 7630, the positioning part 7640, the beacon reception part 7650, the vehicle interior equipment I/F 7660, or the in-vehicle network I/F 7680, and create local map information including peripheral information on the current position of the vehicle. Furthermore, the microcomputer 7610 may predict danger such as collision of a vehicle, approach of a pedestrian, or entry into a road where traffic is stopped, or the like on the basis of acquired information to generate a warning signal. The warning signal may be, for example, a signal for generating an alarm sound or for turning on a warning lamp.

The audio image output part 7670 transmits an output signal of at least one of audio and image to an output device capable of visually or audibly notifying the occupant of the vehicle or the outside of the vehicle, of information. In the example of FIG. 29, as an output device, an audio speaker 7710, a display part 7720, and an instrument panel 7730 are illustrated. The display part 7720 may include at least one of an on-board display or a head-up display, for example. The display part 7720 may have an augmented reality (AR) display function. The output device may be other devices including a wearable device such as a headphone, a spectacular display worn by an occupant, a projector, a lamp, or the like other than these devices. In a case where the output device is a display device, the display device visually displays the result obtained by the various processing performed by the microcomputer 7610 or the information received from the other control unit in various formats such as text, image, table, or graph. Furthermore, in a case where the output device is an audio output device, the audio output device converts an audio signal including reproduced audio data, acoustic data, or the like into an analog signal, and outputs the result audibly.

Note that, in the example shown in FIG. 29, at least two control units connected via the communication network 7010 may be integrated as one control unit. Alternatively, each control unit may be constituted by a plurality of control units. Moreover, the vehicle control system 7000 may include another control unit not shown. Furthermore, in the above description, some or all of the functions carried out by any one of the control units may be performed by the other control unit. That is, as long as information is transmitted and received via the communication network 7010, predetermined operation processing may be performed by any control unit. Similarly, a sensor or device connected to any of the control units may be connected to another control unit, and a plurality of control units may transmit and receive detection information to and from each other via the communication network 7010.

Note that a computer program for realizing each function of the distance detection device 10 (30, 50, 70, 90, 110) according to the present embodiment described with reference to FIGS. 1 to 27 can be mounted on any control unit or the like. Furthermore, it is possible to provide a computer readable recording medium in which such a computer program is stored. The recording medium is, for example, a magnetic disk, an optical disk, a magneto-optical disk, a flash memory, or the like. Furthermore, the computer program described above may be delivered via, for example, a network without using a recording medium.

In the vehicle control system 7000 described above, the light projection control part 12, the imaging control part 14, the determination part 15 (decision part 111), and the distance detection part 16 according to the present embodiment described with reference to FIGS. 1 to 27 can be applied to the integrated control unit 7600 of the application example shown in FIG. 29. For example, the light projection control part 12, the imaging control part 14, the determination part 15 (decision part 111), and the distance detection part 16 correspond to the microcomputer 7610 of the integrated control unit 7600. Furthermore, the light projection part 11 and the imaging device 13 can be applied to the imaging part 7410. For example, the integrated control unit 7600 can determine the pair of the first pixel group and the second pixel group to detect the distance between the imaging device and the subject in the periphery of own vehicle (for example, other vehicles, people, road barriers, or the like) using an imaging device with high versatility.

Furthermore, at least a part of the components of the light projection control part 12, the imaging control part 14, the determination part 15 (decision part 111), and the distance detection part 16 described with reference to FIGS. 1 to 27 may be realized in a module for the integrated control unit 7600 shown in FIG. 29 (for example, an integrated circuit module including one die). Alternatively, the light projection control part 12, the imaging control part 14, the determination part 15 (decision part 111), and the distance detection part 16 described with reference to FIGS. 1 to 27 may be realized by a plurality of control units of the vehicle control system 7000 shown in FIG. 29.

The effects described in the present specification are merely examples and are not intended to be limiting, and other effects may be provided.

Furthermore, the embodiments of the present disclosure are not limited to the above-described embodiments, and various modifications are possible without departing from the gist of the present disclosure.

For example, in the above-described embodiment, the determination part 15 determines the first pixel group and the second pixel group on the basis of the light projection period supplied from the light projection control part 12 and the charge accumulation period supplied from the imaging control part 14. However, the determination part 15 may control the light projection period and the charge accumulation period such that a predetermined pixel groups are determined to be the first pixel group and the second pixel group.

Furthermore, a plurality of distance detection devices 10 may be provided for the same target object. In this case, in order to prevent the reflected light from the target object of the pulse light projected from the light projection part 11 of the other distance detection device 10 being received by the imaging device 13 and the accuracy of the distance detection from being reduced, it is preferable that the detection device 10 separate reflected light of own pulse light and the other pulse light. As a method of separating the reflected light of own pulse light and the other pulse light, for example, there are a method of installing a polarizing plate on the front surface of the imaging device 13, a method of making a wavelength of the pulsed light and a transmission detecting wavelength of the color filter mounted on the imaging device 13 different for each distance detection device 10, and the like.

Moreover, in a case where the light projection period and the charge accumulation period are fixed, the processes of steps S11 to S13 of FIG. 3 may be performed earlier than the distance detection processing.

Note that, the present disclosure can adopt the following configuration.

(1)

A signal processing device including a determination part that determines a pair of pixel groups used for detection of the distance between an imaging device and a subject on the basis of a charge accumulation period for each pixel group of the imaging device in which the charge accumulation period is controlled for each pixel group, and a light projection period of pulse light to be projected.

(2)

The signal processing device according to (1) described above, in which the determination part determines, as one pixel group of the pair, a pixel group in which the charge accumulation period is the same as the light projection period.

(3)

The signal processing device according to (2) described above, in which the determination part determines, as another pixel group of the pair, a pixel group in which a start time of the charge accumulation period is the same as an end time of the light projection period.

(4)

The signal processing device according to (1) described above, in which the determination part determines, as one pixel group of the pair, a pixel group in which a start time of the charge accumulation period is earlier than a start time of the projection period, and an end time of the charge accumulation period is the same as an end time of the light projection period.

(5)

The signal processing device according to (4) described above, in which the determination part determines, as another pixel group of the pair, a pixel group in which a start time of the charge accumulation period is the same as an end time of the light projection period.

(6)

The signal processing device according to (4) described above, in which the determination part determines, as another pixel group of the pair, a pixel group in which a start time of the charge accumulation period is later than a start time of the light projection period, and is the same as an end time of the light projection period or earlier than the end time of the light projection period.

(7)

The signal processing device according to (1) described above, in which the determination part determines, as one pixel group of the pair, a pixel group in which a start time of the charge accumulation period is earlier than a start time of the light projection period, and an end time of the charge accumulation period is later than the start time of the light projection period, and is the same as an end time of the light projection period or earlier than the end time of the light projection period.

(8)

The signal processing device according to (7) described above, in which the determination part determines, as another pixel group of the pair, a pixel group in which a start time of the charge accumulation period is the same as an end time of the charge accumulation period of one pixel group of the pair.

(9)

The signal processing device according to (1) described above, in which the determination part determines, as one pixel group of the pair, a pixel group in which a start time of the charge accumulation period is earlier than a start time of the light projection period, and an end time of the charge accumulation period is the same as an end time of the light projection period or later than the end time of the light projection period.

(10)

The signal processing device according to (9) described above, in which the determination part determines, as another pixel group of the pair, a pixel group in which a start time of the charge accumulation period is later than a start time of the light projection period, and is the same as an end time of the light projection period or earlier than the end time of the light projection period.

(11)

The signal processing device according to (1) described above, in which the determination part determines, as one pixel group of the pair, a pixel group in which a start time of the charge accumulation period is earlier than a light reception start time in which light reception by the imaging device of a reflected light of the pulse light starts in a case where a distance between the imaging device and the subject is a predetermined distance.

(12)

The signal processing device according to (11) described above, in which the determination part determines, as one pixel group of the pair, a pixel group in which an end time of the charge accumulation period is the same as a light reception end time in which light reception by the imaging device of reflected light of the pulse light ends or later than the light reception end time in a case where a distance between the imaging device and the subject is a predetermined distance.

(13)

The signal processing device according to any of (1) to (12) described above, in which the determination part determines, as the pair, two pixel groups in which time of the charge accumulation period is shorter than a light projection cycle of the pulse light.

(14)

The signal processing device according to any of (1) to (13) described above, further including a distance detection part that detects the distance between the imaging device and the subject on the basis of a pixel signal of a charge accumulated during the charge accumulation period of a pixel classified to the pixel group of the pair determined by the determination part.

(15)

The signal processing device according to any of (1) to (14) described above, further including a light projection part that projects the pulse light toward the subject.

(16)

The signal processing device according to (15) described above, further including a light projection control part that controls the light projection part to project the pulse light during the light projection period.

(17)

The signal processing device according to any of (1) to (16) described above, further including the imaging device.

(18)

The signal processing device according to (17) described above, further including an imaging device control part that controls the imaging device such that a pixel classified to the pixel group accumulates a charge during the charge accumulation period, for each pixel group.

(19)

A signal processing method including a determination step in which a signal processing device determines a pair of pixel groups used for detection of distance between an imaging device and a subject on the basis of a charge accumulation period for each pixel group of the imaging device in which the charge accumulation period is controlled for each pixel group, and a light projection period of pulse light to be projected.

(20)

A program for causing a computer to function as a signal processing device including a determination part that determines a pair of pixel groups used for detection of the distance between an imaging device and a subject on the basis of a charge accumulation period for each pixel group of the imaging device of which the charge accumulation period is controlled for each pixel group, and a light projection period of pulse light to be projected.

(21)

A signal processing device including a distance possibility judgement part that judges whether operation of distance from an imaging device to a subject is possible on the basis of a first charge accumulation period for a first pixel group of the imaging device, a second charge accumulation period for a second pixel group of the imaging device, and a projection period of pulse light to be projected toward the subject of the imaging device.

(22)

A signal processing method including a distance possibility judgement step in which a signal processing device judges whether operation of distance from an imaging device to a subject is possible on the basis of a first charge accumulation period for a first pixel group of the imaging device, a second charge accumulation period for a second pixel group of the imaging device, and a light projection period of pulse light to be projected toward the subject of the imaging device.

REFERENCE SIGNS LIST

10 Distance detection device
11 Light projection part
12 Light projection control part
13 Imaging device
14 Imaging device control part
15 Determination part
16 Distance detection part
30, 50, 70, 90, 110 Distance detection device
111 Decision part

The invention claimed is:

1. A signal processing device comprising
   a light projection control circuit configured to determine a pulse light start time and a pulse light end time for a pulse light projection period of a target pulse;
   a determination circuit configured to determine charge accumulation periods for respective pixel groups corresponding to the target pulse, the pixel groups including a first pixel group having a first charge accumulation period start time and a first charge accumulation period end time, the pixel groups further including a second pixel group having a second charge accumulation period start time and a second charge accumulation period end time, and to perform a pairing of the first pixel group and the second pixel group based upon the pulse light start time, the pulse light end time, the first charge accumulation period start time, the first charge accumulation period end time, the second charge accumulation period start time, and the second charge accumulation period end time; and
   a distance detection circuit configured to detect a distance between an imaging device and a subject on a basis of the pairing of the first pixel group and the second pixel group.

2. The signal processing device according to claim 1, wherein
the determination circuit determines the charge accumulation period of the first pixel group to be the same as the pulse light projection period.

3. The signal processing device according to claim 2, wherein
the determination circuit determines the second charge accumulation period start time to be the same as the pulse light end time.

4. The signal processing device according to claim 1, wherein
the determination circuit determines the first charge accumulation periods start time to be earlier than the pulse light start time and the first charge accumulation period end time to be the same as the pulse light end time.

5. The signal processing device according to claim 4, wherein
the determination circuit determines the second charge accumulation period start time to be the same as the pulse light end time.

6. The signal processing device according to claim 4, wherein
the determination circuit determines the second charge accumulation period end time to be later than the pulse light start time, and to be the same as or earlier than the pulse light end time.

7. The signal processing device according to claim 1, wherein
the determination circuit determines the first charge accumulation period start time to be earlier than the pulse light start time, and the first charge accumulation period end time to be later than the pulse light start time, and the same as or earlier than the pulse light end time.

8. The signal processing device according to claim 7, wherein
the determination circuit determines the second charge accumulation period start time to be the same the first charge accumulation period end time.

9. The signal processing device according to claim 1, wherein
the determination circuit determines the first charge accumulation period start time to be earlier than the pulse light start time, and the first charge accumulation period end time to be the same as or later than the pulse light end time.

10. The signal processing device according to claim 9, wherein
the determination circuit determines the second charge accumulation period start time to be later than the pulse light start time, and to be the same as or earlier than the pulse light end time.

11. The signal processing device according to claim 1, wherein
the determination circuit determines the first pixel group based upon the first charge accumulation period start time being period is earlier than a light reception start time in which light reception by the imaging device of a reflected light of the pulse light starts in a case where a distance between the imaging device and the subject is a predetermined distance.

12. The signal processing device according to claim 11, wherein
the determination circuit determines the first pixel group based upon the first charge accumulation period end time being the same as a light reception end time in which light reception by the imaging device of reflected light of the pulse light ends or later than the light reception end time in a case where a distance between the imaging device and the subject is a predetermined distance.

13. The signal processing device according to claim 1, wherein
the determination circuit determines the first and second pixel groups based upon their charge accumulation periods being shorter than the pulse light projection period.

14. The signal processing device according to claim 1, further comprising
the distance detection circuit detects the distance between the imaging device and the subject on a basis of a pixel signal of a charge accumulated during the charge accumulation period of a pixel classified to one of the first and second pixel groups.

15. The signal processing device according to claim 1, further comprising the imaging device.

16. The signal processing device according to claim 15, further comprising:
an imaging device controller that controls the imaging device such that pixels respectively classified to the first and second pixel groups accumulate charge during their respective charge accumulation periods.

17. A signal processing method comprising:
determining a pulse light start time and a pulse light end time for a pulse light projection period of a target pulse;
determining charge accumulation periods for respective pixel groups corresponding to the target pulse, the pixel groups including a first pixel group having a first charge accumulation period start time and a first charge accumulation period end time, the pixel groups further including a second pixel group having a second charge accumulation period start time and a second charge accumulation period end time;
performing a pairing of the first pixel group and the second pixel group based upon the pulse light start time, the pulse light end time, the first charge accumulation period start time, the first charge accumulation period end time, the second charge accumulation period start time, and the second charge accumulation period end time; and
detecting a distance between an imaging device and a subject on a basis of the pairing of the first pixel group and the second pixel group.

18. A non-transitory computer readable medium storing a program, the program being executable by a processor to perform operations comprising:
determining a pulse light start time and a pulse light end time for a pulse light projection period of a target pulse;
determining charge accumulation periods for respective pixel groups corresponding to the target pulse, the pixel groups including a first pixel group having a first charge accumulation period start time and a first charge accumulation period end time, the pixel groups further including a second pixel group having a second charge accumulation period start time and a second charge accumulation period end time;
performing a pairing of the first pixel group and the second pixel group based upon the pulse light start time, the pulse light end time, the first charge accumulation period start time, the first charge accumulation period end time, the second charge accumulation period start time, and the second charge accumulation period end time; and detecting a distance between an imaging device and a subject on a basis of the pairing of the first pixel group and the second pixel group.

* * * * *